(12) United States Patent
VanGilder et al.

(10) Patent No.: US 11,570,934 B2
(45) Date of Patent: Jan. 31, 2023

(54) SYSTEMS AND METHODS FOR GENERATING IN A GRAPHICAL USER INTERFACE A DISPLAY REPRESENTING AIR TEMPERATURES, PRESSURES, AND VELOCITIES IN AN INFORMATION TECHNOLOGY ROOM

(71) Applicant: SCHNEIDER ELECTRIC IT CORPORATION, Foxboro, MA (US)

(72) Inventors: James William VanGilder, Pepperell, MA (US); Yatharth Kishor Vaishnani, Lowell, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/644,855

(22) Filed: Dec. 17, 2021

(65) Prior Publication Data

US 2022/0151109 A1 May 12, 2022

Related U.S. Application Data

(63) Continuation of application No. 17/122,083, filed on Dec. 15, 2020, now Pat. No. 11,246,240.

(Continued)

(51) Int. Cl.
*G06F 1/16* (2006.01)
*H05K 5/00* (2006.01)

(Continued)

(52) U.S. Cl.
CPC ......... *H05K 7/20563* (2013.01); *H05K 7/207* (2013.01); *H05K 7/20145* (2013.01)

(58) Field of Classification Search
CPC ........... H05K 7/20563; H05K 7/20145; H05K 7/207; H05K 7/20572; H05K 7/20581;

(Continued)

(56) References Cited

U.S. PATENT DOCUMENTS 7,979,250 B2 * 7/2011 Archibald ............... G06F 30/13
 374/134
8,498,114 B2 * 7/2013 Martini ................ F24F 11/0001
 361/679.5

(Continued)

FOREIGN PATENT DOCUMENTS

WO 200863675 A2 5/2008

OTHER PUBLICATIONS

Brouchure—Learning Objectives for this Session, Jun. 25, 2012, 5 pages.
Extended European Search Report from corresponding European Application No. 20214000.0 dated Apr. 19, 2021.
Pardey, Zachary M. et al., "Proposal for Standard Compact Server Model for Transient Data Center Simulations," CH-15-036, 2015 ASHRAE, pp. 413-421.

(Continued)

*Primary Examiner* — Anthony M Haughton
(74) *Attorney, Agent, or Firm* — Lando & Anastasi, LLP

(57) ABSTRACT

A system for determining and displaying in a graphical user interface one or more of air temperature, pressure, or velocity in an information technology (IT) room including an IT equipment rack comprises a processor configured to receive an input comprising airflow resistance parameters through the rack, an IT equipment airflow parameter, a heat-dissipation parameter, an external pressure, and an external temperature, to run the input through a flow-network solver that solves for airflow velocities through at least one face of the rack and a rack air outflow temperature based on the input, provide an output including the airflow velocities and the rack air outflow temperature, and generate, based on the output, a display in a graphical user interface of the system illustrating one or more of air temperatures, air pressures, or airflow velocities within the IT room.

20 Claims, 12 Drawing Sheets

Related U.S. Application Data

(60) Provisional application No. 62/948,654, filed on Dec. 16, 2019.

(51) Int. Cl.
  *H05K 7/00* (2006.01)
  *H05K 7/20* (2006.01)

(58) Field of Classification Search
  CPC .. H05K 7/2059; H05K 7/20136; H05K 7/202; H05K 7/20209
  See application file for complete search history.

(56) References Cited

U.S. PATENT DOCUMENTS

| | | | |
|---|---|---|---|
| 11,076,509 B2* | 7/2021 | Alissa | H05K 7/20836 |
| 2005/0225936 A1* | 10/2005 | Day | H05K 7/20745 361/679.47 |
| 2008/0055848 A1* | 3/2008 | Hamburgen | H05K 7/20136 361/691 |
| 2008/0174954 A1* | 7/2008 | VanGilder | H05K 7/20745 361/679.54 |
| 2012/0158387 A1 | 6/2012 | VanGilder et al. | |
| 2014/0330447 A1* | 11/2014 | VanGilder | H05K 7/20745 700/300 |
| 2017/0188486 A1* | 6/2017 | VanGilder | G01F 1/69 |
| 2017/0322572 A1 | 11/2017 | VanGilder et al. | |
| 2020/0359532 A1 | 11/2020 | VanGilder | |

OTHER PUBLICATIONS

Rambo, Jeffrey D. et al., "Multi-Scale Modeling of High Power Density Data Centers," Proceedings of IPACK03, International Electronic Packaging Technical Conference and Exhibition, Jul. 6-11, 2003, Maui, Hawaii, USA, IPACK2003-35297, 7 pages.

Rambo, Jeffrey et al., "Modeling of data center airflow and heat transfer: State of the art and future trends," Distrib Parallel Databases (2007) 21:193-225; DOI: 10.1007/s10619-006-7007-3.

Shrivastava SK et al: "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009 (Jul. 19, 2009), pp. 785-791, XP009156818, DOI: 10.1115/INTERPACK2009-89161.

Tian, Wei et al., "An Accurate Fast Fluid Dynamics Model for Data Center Applications," 18th IEEE ITHERM Conference, 2020 IEEE, 7 pages.

VanGilder, James et al., "Balancing Cooling and IT Airflow with Dampers in Ceiling-Ducted Hot-Aisle Containment in Data Centers," 18th IEEE ITHERM Conference, 2019 Conference, 7 pages.

VanGilder, James et al., A Compace Rack Model for Data Center CFD Modeling, 19th IEEE ITHERM Conference, 2020 IEEE, 7 pages.

Zhai, John et al. "The Development of Simplified Rack Boundary Conditions for Numerical Data Center Models," (ASHRAE-RP-1487) TC 4:10—Indoor Enviornmental Modeling, Aug. 8, 2011, pp. 105.

* cited by examiner

SYSTEMS AND METHODS FOR GENERATING IN A GRAPHICAL USER INTERFACE A DISPLAY REPRESENTING AIR TEMPERATURES, PRESSURES, AND VELOCITIES IN AN INFORMATION TECHNOLOGY ROOM

CROSS-REFERENCE TO RELATED APPLICATIONS

This application claims priority under 35 U.S.C. § 120 as a continuation of U.S. patent application Ser. No. 17/122,083, titled SYSTEMS AND METHODS FOR GENERATING IN A GRAPHICAL USER INTERFACE A DISPLAY REPRESENTING AIR TEMPERATURES, PRESSURES, AND VELOCITIES IN AN INFORMATION TECHNOLOGY ROOM, filed Dec. 15, 2020, that claims priority under 35 U.S.C. § 119(e) to U.S. Provisional Patent Application Ser. No. 62/948,654, titled SYSTEMS AND METHODS FOR DETERMINING AND CONTROLLING EQUIPMENT RACK AIRFLOW SYSTEMS, filed Dec. 16, 2019, each of which being incorporated herein by reference in its entirety for all purposes.

BACKGROUND

1. Field of the Disclosure

At least one example in accordance with the present disclosure relates generally to systems and methods for generating in a graphical user interface a display representing air temperatures, pressures, and velocities in an information technology room.

2. Discussion of Related Art

Centralized IT rooms or data centers for computer, communications, and other electronic equipment contain numerous equipment racks of equipment that require power, cooling, and connections to external communications facilities. Electronic equipment contained in the equipment racks generate substantial heat and accordingly typical equipment racks use air flow through the racks to cool the electronic equipment.

SUMMARY

According to at least one aspect of the present disclosure, there is provided a black-box rack model for data-center computational fluid dynamics (CFD) modeling which is simple and computationally efficient yet handles most practical data center applications including open environments, containment, leakage flow through cable cutouts beneath the rack, and blocked rack faces. The model accounts for specific IT equipment and blanking-panel populations and predicts IT-inlet temperatures, which, in general, are different than rack inlet temperatures and may vary based on the location of the IT equipment in the rack. This is accomplished by idealizing internal-rack airflows as constrained to a well-defined flow-network topology. The model exchanges airflow, pressure, and temperature data with the parent CFD model along the rack periphery. The additional computations required by the model are modest with no appreciable loss of solution speed relative to the simplest black-box models. Aspects and embodiments disclosed herein represent an improvement in the ability of a computer to quickly calculate airflow and temperature in an IT room or data center, including within racks in the IT room or data center, as compared to prior known computational fluid dynamics methodologies.

According to at least one aspect of the present disclosure a non-transitory computer-readable medium storing thereon sequences of computer-executable instructions for determining airflows for an equipment rack in an IT room or data center, the sequences of computer-executable instructions including instructions that instruct at least one processor to receive data related to external equipment rack air pressure, determine internal air pressures at a plurality of nodes within the equipment rack, and determine airflow rates of at least one face of the equipment rack.

In accordance with one aspect, there is provided a system for determining and displaying in a graphical user interface one or more of air temperature, pressure, or velocity in an information technology (IT) room including an IT equipment rack. The system comprises a processor configured to receive an input comprising airflow resistance parameters through the rack, an IT equipment airflow parameter, a heat-dissipation parameter, an external pressure, and an external temperature. The heat-dissipation parameter is associated with the IT equipment airflow parameter, and the IT equipment airflow parameter is associated with at least one fan associated with IT equipment in the rack and providing airflow through the IT equipment. The processor is further configured to run the input through a flow-network solver that solves for airflow velocities through at least one face of the rack and a rack air outflow temperature based on the input, provide an output including the airflow velocities and the rack air outflow temperature, and generate, based on the output, a display in a graphical user interface illustrating one or more of air temperatures, air pressures, or airflow velocities within the IT room.

In some embodiments, the airflow resistance parameters include airflow resistance between a front and a rear of the rack, airflow resistance between the rear and a top of the rack, and airflow resistance between the rear and a bottom of the rack.

In some embodiments, the processor is further configured to output the rack-airflow rate and the rack air outflow temperature to a computational fluid dynamics model and to calculate temperatures and air flows throughout the IT room utilizing the computational fluid dynamics model. The processor may be further configured to one of control one or more computer room air conditioners to adjust airflow in the IT room or control one or more items of equipment housed in the rack to reduce power if the rack air outflow temperature is not adequate to provide sufficient cooling to equipment housed in the rack.

In accordance with another aspect, there is provided a non-transitory computer-readable medium storing thereon sequences of computer-executable instructions for determining and displaying in a graphical user interface one or more of air temperature, pressure, or velocity in an information technology (IT) room including an IT equipment rack, the sequences of computer-executable instructions including instructions that instruct at least one processor to receive an input comprising airflow resistance between a front and a rear of the rack, airflow resistance between the rear and a top of the rack, airflow resistance between the rear and a bottom of the rack, an IT equipment airflow parameter associated with at least one fan providing airflow through the rack, a heat-dissipation parameter associated with the IT equipment airflow parameter, an external pressure, and an external temperature, run the input through a flow-network solver that solves for a rack-airflow rate and a rack air outflow temperature based on the input, provide an output including the rack-airflow rate and the rack air outflow temperature, and generate, based on the output, a display in a graphical user interface illustrating one of air temperatures, air pressures, or airflow velocities within the IT room.

In some embodiments, the computer-executable instructions further instruct the at least one processor to utilize the rack-airflow rate and the rack air outflow temperature as variables in a computational fluid dynamics model and utilize the computational fluid dynamic model to determine temperatures and air flows throughout the IT room.

In accordance with another aspect, there is provided a non-transitory computer-readable medium storing thereon sequences of computer-executable instructions for determining and displaying in a graphical user interface one or more of air temperature, pressure, or velocity in an information technology (IT) room including an equipment rack, the sequences of computer-executable instructions including instructions that cause at least one processor to receive an input comprising airflow resistance parameters through the rack, an IT equipment airflow parameter, a heat-dissipation parameter, an external pressure, and an external temperature. The heat-dissipation parameter is associated with the IT equipment airflow parameter, and the IT equipment airflow parameter is associated with at least one fan providing airflow through the rack. The sequences of computer-executable instructions further include instructions that cause at least one processor to run the input through a flow-network solver that solves for a rack-airflow rate and a rack air outflow temperature based on the input, provide an output including the rack-airflow rate and the rack air outflow temperature, and generate, based on the output, a display in a graphical user interface illustrating one of air temperatures, air pressures, or airflow velocities within the IT room.

In some embodiments, the airflow resistance parameters include airflow resistance between a front and a rear of the rack, airflow resistance between the rear and a top of the rack, and airflow resistance between the rear and a bottom of the rack.

In some embodiments, solving for the rack-airflow rate includes solving for a flow rate of air through each of a front face of the rack, a rear face of the rack, a top of the rack, and a bottom of the rack.

In some embodiments, solving for the rack air outflow temperature includes solving for temperatures of air flowing through each of a rear face of the rack and a top of the rack. Solving for the rack air outflow temperature may further include solving for a temperature of air flowing through a bottom of the rack.

In some embodiments, the flow-network solver solves for the rack-airflow rate and the rack air outflow temperature for multiple portions of the rack each at different heights. In some embodiments, the flow-network solver solves for the rack-airflow rate and the rack air outflow temperature for the multiple portions of the rack under a constraint that air flow resistances from the front to the rear of the rack are the same for each of the multiple portions, air flow resistances from the rear to the top of the rack are the same for each of the multiple portions, and air flow resistances from the rear to the bottom of the rack are the same for each of the multiple portions.

In some embodiments, the flow-network solver solves for the rack-airflow rate and the rack air outflow temperature for the multiple portions of the rack under a constraint that air flow through the rear of the rack in at least one of the multiple portions of the rack is blocked. The flow-network solver may solve for the rack-airflow rate for the multiple portions of the rack by solving a system of nonlinear equations including air flow resistances between adjacent ones of the multiple portions of the rack as input variables. The flow-network solver may solve for the rack air outflow temperature for the multiple portions of the rack by solving a system of linear equations.

In some embodiments, the flow-network solver solves for the rack-airflow rate and the rack air outflow temperature for the multiple portions of the rack under one of a constraint that air flow through the top of the rack is blocked, a constraint that air flow through the bottom of the rack is blocked, or a constraint that air flow through the rear of the rack in each of the multiple portions of the rack is blocked. The flow-network solver may solve for the rack-airflow rate and the rack air outflow temperature for the multiple portions of the rack without utilizing air flow resistances between adjacent ones of the multiple portions of the rack as input variables.

In some embodiments, the flow-network solver solves for average pressure at the rear of the rack under a constraint that air flow through the rear of the rack is blocked utilizing only pressure at the front of the rack, pressure at the top of the rack, air flow resistance between the front and rear of the rack, air flow resistance between the rear and top of the rack, and the fixed airflow rate as input variables. The flow-network solver may solve for average pressure at the rear of the rack under a constraint that air flow through the rear of the rack is blocked utilizing only air flow resistance between the front and rear of the rack, air flow resistance between the rear and top of the rack, and the fixed airflow rate as input variables.

In accordance with another aspect, there is provided a method for determining and displaying in a graphical user interface one or more of air temperature, pressure, or velocity in an information technology (IT) room including an equipment rack. The method comprises receiving an input comprising airflow resistance parameters through the rack, an IT equipment airflow parameter, a heat-dissipation parameter, an external pressure, and an external temperature. The heat-dissipation parameter is associated with the IT equipment airflow parameter, and the IT equipment airflow parameter is associated with at least one fan providing airflow through the rack. The method further comprises running the input through a flow-network solver that solves for a rack-airflow rate and a rack air outflow temperature based on the input, outputting the rack-airflow rate and the rack air outflow temperature, and generating, based on the output, a display in a graphical user interface illustrating one or more of air temperatures, air pressures, or airflow velocities within the IT room of the rack-airflow rate and the rack air outflow temperature.

In some embodiments, the airflow resistance parameters include airflow resistance between a front and a rear of the rack, airflow resistance between the rear and a top of the rack, and airflow resistance between the rear and a bottom of the rack.

In some embodiments, solving for the rack-airflow rate includes solving for a flow rate of air through each of a front face of the rack, a rear face of the rack, a top of the rack, and a bottom of the rack.

In some embodiments, solving for the rack air outflow temperature includes solving for temperatures of air flowing through each of a rear face of the rack and a top of the rack. Solving for the rack air outflow temperature may further include solving for a temperature of air flowing through a bottom of the rack.

In some embodiments, the flow-network solver solves for the rack-airflow rate and the rack air outflow temperature for multiple portions of the rack each at different heights. In some embodiments, the flow-network solver solves for the rack-airflow rate and the rack air outflow temperature for the multiple portions of the rack under a constraint that air flow resistances from the front to the rear of the rack are the same for each of the multiple portions, air flow resistances from the rear to the top of the rack are the same for each of the multiple portions, and air flow resistances from the rear to the bottom of the rack are the same for each of the multiple portions.

In some embodiments, the flow-network solver solves for the rack-airflow rate and the rack air outflow temperature for the multiple portions of the rack under a constraint that air flow through the rear of the rack in at least one of the multiple portions of the rack is blocked. The flow-network solver may solve for the rack-airflow rate for the multiple portions of the rack by solving a system of nonlinear equations including air flow resistances between adjacent ones of the multiple portions of the rack as input variables. The flow-network solver may solve for the rack air outflow temperature for the multiple portions of the rack by solving a system of linear equations.

In some embodiments, the flow-network solver solves for the rack-airflow rate and the rack air outflow temperature for the multiple portions of the rack under one of a constraint that air flow through the top of the rack is blocked, a constraint that air flow through the bottom of the rack is blocked, or a constraint that air flow through the rear of the rack in each of the multiple portions of the rack is blocked. The flow-network solver may solve for the rack-airflow rate and the rack air outflow temperature for the multiple portions of the rack without utilizing air flow resistances between adjacent ones of the multiple portions of the rack as input variables.

In some embodiments, the flow-network solver solves for average pressure at the rear of the rack under a constraint that air flow through the rear of the rack is blocked utilizing only pressure at the front of the rack, pressure at the top of the rack, air flow resistance between the front and rear of the rack, air flow resistance between the rear and top of the rack, and the fixed airflow rate as input variables. The flow-network solver may solve for average pressure at the rear of the rack under a constraint that air flow through the rear of the rack is blocked utilizing only air flow resistance between the front and rear of the rack, air flow resistance between the rear and top of the rack, and the fixed airflow rate as input variables.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
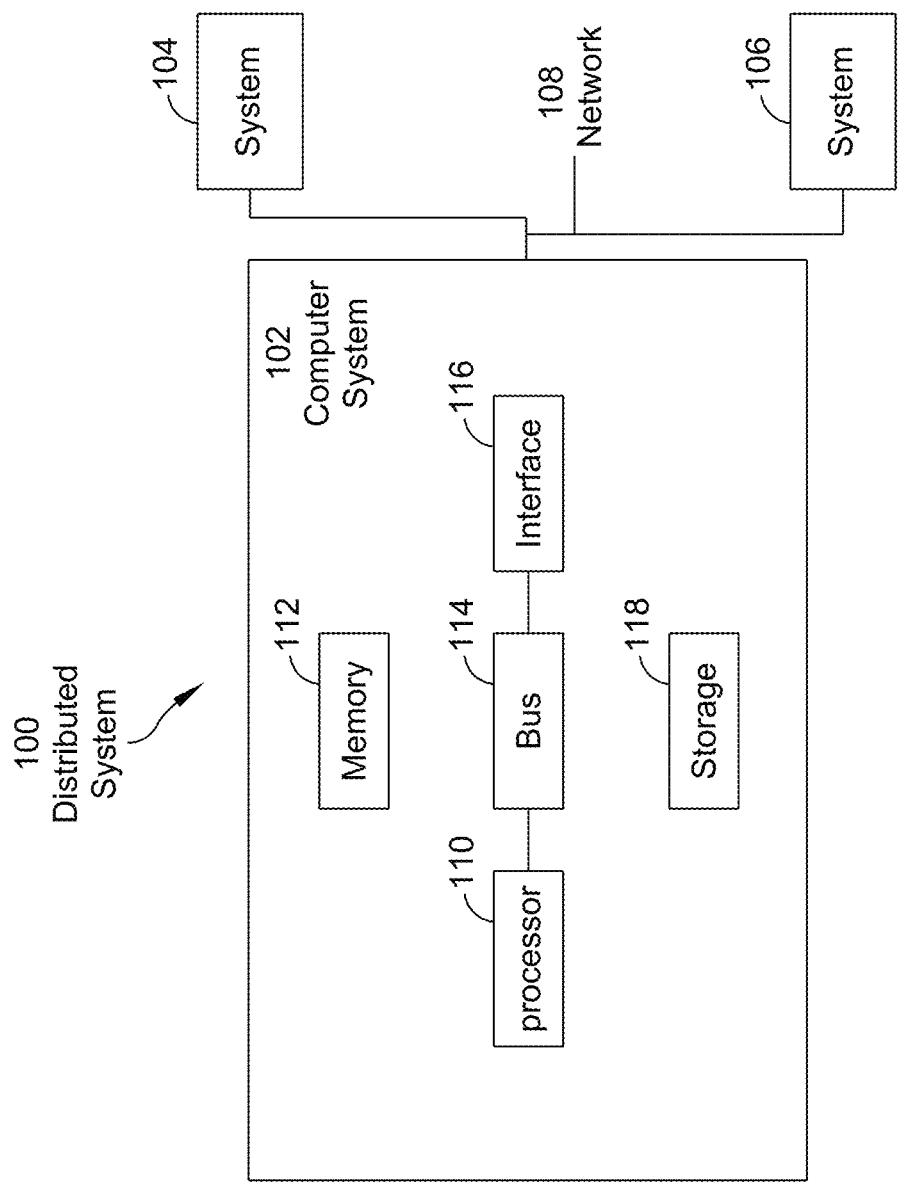
FIG. 1 is a block diagram of one example of a computer system with which various aspects in accord with the present invention may be implemented.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

IT rooms may contain one or more types of IT equipment that may manipulate, receive, store, and/or transmit multiple forms of data including, for example, voice or video data. The IT equipment can be housed in IT racks. Instead or in addition, equipment such as power supplies, user interfaces, etc., may be mounted in IT racks in IT rooms. IT rooms may include cooling equipment for the IT equipment. The cooling equipment may be mounted in racks along with the IT equipment or provided as one or more separate units, sometimes referred to as computer room air conditioner (CRAC) units. Data centers are one type of IT room.

Electronic equipment populations and resulting airflow patterns inside a rack can be complex. Additionally, racks can be "leaky," in that external pressurization may drive airflow through one face (or portion of a face) and out one or more other faces of the rack. In at least some embodiments described herein the airflow patterns may be modeled to achieve accurate simulations for many practical applications including cold or hot-aisle containment. Some rack models may be either too simplistic and inaccurate or too detailed and slow. Sometimes, more than one type of rack model may be employed in a single IT room CFD model. A rack model may be used to generate, in a graphical user interface, a display representing air temperatures, pressures, and velocities in an IT room.

A model of an IT rack for Computational Fluid Dynamics (CFD) modeling of IT room applications is provided in accordance with at least one embodiment. The model may retain the speed and simplicity of simple black-box models while modeling internal-rack airflows with sufficient detail so as to make the model accurate and practical for data-center applications and for generating, in a graphical user interface, a display representing air temperatures, pressures, and velocities in an IT room. The model improves upon prior known methods of predicting airflow and temperature within IT equipment racks and generating, in a graphical user interface, a display representing air temperatures, pressures, and velocities in an IT room by reducing the computational requirements for making these predictions and reducing the time required to perform these predictions.

In at least one embodiment, a rack model is idealized as a flow network, distributed throughout the rack, which exchanges data with a parent CFD model of the IT room including the rack. By limiting calculations of airflow and temperatures within the rack to a well-defined and limited topology, the required physics can be modelled while not appreciably adding to solutions times relative to simple black-box models. Furthermore, by avoiding the creation of small (and non-uniform) grid cells inside the rack, the model remains robust. Improvements offered by at least some methods and systems for modelling airflows and generating, in a graphical user interface, a display representing air temperatures, pressures, and velocities in an IT room described herein may include:

1. The ability to model pressure-driven leakage flow. This is very common as (cold or hot-aisle) containment creates pressurized zones which drives airflow through the rack. The pressurized plenum may also drive airflow through cable cutouts under the rack.
2. The model may "comprehend" that the resistance to airflow through the rack depends on the path taken. For example, airflow may pass into the rear and then out of the top of the rack while experiencing little resistance. However, airflow entering the front of the rack and exiting through either the rear or top of the rack will experience much more resistance.
3. The ability of the model to handle "blocked" faces or portions of blocked faces. For example, when the rack model is placed against the wall in the CFD model, the rear of the rack becomes pressurized, which will drive IT airflow out of the top or back to the front (recirculation) as would happen in real IT rooms.
4. The fact that the flow resistances in the rack are based directly on experimental measurements and may, therefore, be even more accurate than very-detailed, explicit CFD models.
5. The ability to model internal IT equipment temperatures, which may be different than rack-inlet temperatures due to internal recirculation.
6. The ability to model diverse IT populations, missing blanking panels, etc.
7. The ability to model the thermal mass of the IT equipment.
8. The speed with which a graphical user interface including a display accurately representing air temperatures, pressures, and velocities in an IT room may be generated.

A single compact model in accordance with at least some embodiments can be used in IT-room or data-center contexts where, today, multiple models would be required, making the process of generating a graphical user interface including a display accurately representing air temperatures, pressures, and velocities in an IT room slower.

Systems and methods provided herein allow equipment rack airflows to be modelled on a computer and a graphical user interface including a display accurately representing air temperatures, pressures, and velocities in an IT room to be generated quickly. As a result of the model and generated display, airflow systems for equipment racks can be designed and implemented in existing IT rooms and/or during the design of new IT rooms.

Various computing devices may execute various operations discussed above. Using data stored in associated memory, in one example, a computer executes one or more instructions stored on one or more non-transitory computer-readable media that may result in manipulated data. In some examples, the computer may include one or more processors or other types of computing hardware. In one example, the computing hardware is or includes a commercially available, general-purpose processor. In another example, the computer performs at least a portion of the operations discussed herein using an application-specific integrated circuit (ASIC) tailored to perform particular operations in addition to, or in lieu of, a general-purpose processor. As illustrated by these examples, examples in accordance with the present invention may perform the operations described herein using many specific combinations of hardware and software and the invention is not limited to any particular combination of hardware and software components.

In various examples, a computer may implement a multi-threading process to execute operations discussed above. For example, while a first thread of the computer may perform operations including determining airflows in an equipment rack, a second thread of the computer may calculate one or more variables associated with airflow models discussed herein. In at least one embodiment, a computer contained within an IT room management system is configured to model airflow in equipment racks using methods described herein. Further, in at least one example, the IT room management system may monitor and control airflows in IT rooms equipment racks based on results generated by the system. Based on model results, IT room cooling systems, including cooling components contained in equipment racks, may be controlled by the IT room management system to improve overall cooling in an IT room.

Aspects disclosed herein in accordance with the present embodiments, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling, and presenting information regarding specific IT room configurations. The computer system may present the information to a user as a display of one or more of airflow, temperatures, and related physical parameters or metrics (e.g., pressures, perforated-tile airflow rates, capture indices, etc.) in a portion or throughout an IT room in a graphical user interface. Further, computer systems in embodiments may receive input from a user and/or directly from physical sensors in the data center that automatically measure environmental parameters in an IT room. The computer system may control equipment, such as chillers or coolers to optimize performance. Moreover, the systems described herein may be configured to include or exclude any of the functions discussed herein. Thus, the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

FIG. 1 shows a block diagram of a distributed computer system 100, in which various aspects and functions in accord with the present embodiments may be practiced. Distributed computer system 100 may include one more computer systems. For example, as illustrated, distributed computer system 100 includes computer systems 102, 104, and 106. As shown, computer systems 102, 104, and 106 are interconnected by, and may exchange data through, communication network 108. Network 108 may include any communication network through which computer systems may exchange data. To exchange data using network 108, computer systems 102, 104, and 106 and network 108 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 102, 104, and 106 may transmit data via network 108 using a variety of security measures including TLS, SSL, or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 1. As depicted, computer system 102 includes processor 110, memory 112, bus 114, interface 116, and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor, multi-processor, microprocessor, or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI, and InfiniBand. Thus, bus 114 enables communications, for example, data and instructions, to be exchanged between system components of computer system 102.

Computer system 102 also includes one or more interface devices 116 such as input devices, output devices, and combination input/output devices. Interface devices may receive input or provide output. More particularly, output devices may render information for external presentation. The interface devices 116 may include, for example, one or more graphical user interfaces that may be disposed proximate to or separate from other components of the computer system 102. A graphical user interface of the computer system 102 may, for example, be displayed through a web browser that accesses information from the memory 112. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable, nonvolatile, non-transitory, storage medium in which instructions are stored that define a program to be executed by the processor. The program to be executed by the processor may cause the processor 100 or computer system 102 to perform any one or more embodiments of the methods disclosed herein. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system. Portions of the memory 112 or storage system 118 may be included in the same computer system as other components of the computer system 102 or may be resident in a cloud-based system that is accessible via the internet or other communications system or protocol.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 1. Various aspects and functions in accord with the presently disclosed embodiments may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system such as Windows NT, Windows 2000 (Windows ME), Windows XP, or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C–, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML, or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Example System Architecture

Figure 2:
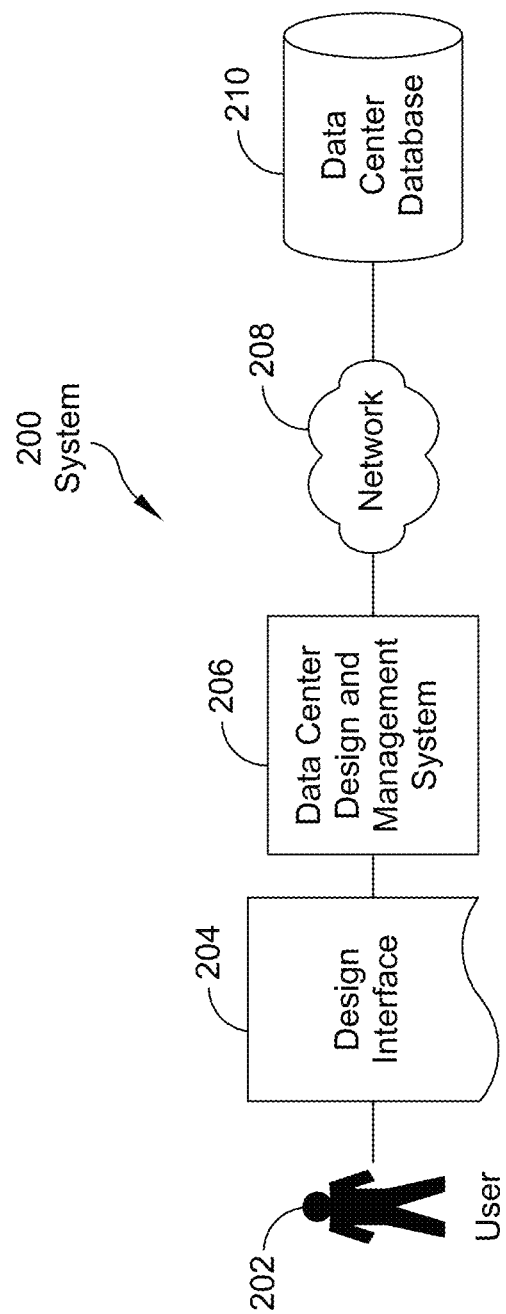
FIG. 2 a schematic of one example of a distributed system including an IT room management system.

FIG. 2 presents a context diagram including physical and logical elements of distributed system 200. As shown, distributed system 200 is specially configured in accordance with the presently disclosed embodiments. The system structure and content recited with regard to FIG. 2 is for exemplary purposes only and is not intended to limit the embodiments to the specific structure shown in FIG. 2. As will be apparent to one of ordinary skill in the art, many variant system structures can be architected without deviating from the scope of the presently disclosed embodiments. The particular arrangement presented in FIG. 2 was chosen to promote clarity.

Information may flow between the elements, components, and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Referring to FIG. 2, system 200 includes user 202, interface 204, IT room design and management system 206, communications network 208, and IT room database 210. System 200 may allow user 202, such as an IT room architect or other IT room personnel, to interact with interface 204 to create or modify a model of one or more IT room configurations. System 200 may allow user 202 to interact with interface 204 to view a graphical display of results of embodiments of models disclosed herein. According to one embodiment, interface 204 may include aspects of the floor editor and the rack editor as disclosed in Patent Cooperation Treaty Application No. PCT/US08/63675, titled "Methods and Systems for Managing Facility Power and Cooling," filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of an IT room or any subset thereof. This layout may include representations of IT room structural components as well as IT room equipment. The features of interface 204, as may be found in various embodiments in accordance with the present invention, are discussed further below. In at least one embodiment, information regarding an IT room is entered into system 200 through the interface via manual data entry and/or by accessing data from one or more sensors present in an IT room, and assessments and recommendations for the IT room are provided to the user. Further, in at least one embodiment, optimization processes may be performed to optimize cooling performance and energy usage of the IT room.

As shown in FIG. 2, IT room design and management system 206 presents data design interface 204 to user 202. According to one embodiment, IT room design and management system 206 may include the IT room design and management system as disclosed in PCT/US08/63675. In this embodiment, design interface 204 may incorporate functionality of the input module, the display module and the builder module included in PCT/US08/63675 and may use the database module to store and retrieve data.

As illustrated, IT room design and management system 206 may exchange information with IT room database 210 via network 208. This information may include any information needed to support the features and functions of IT room design and management system 206. For example, in one embodiment, IT room database 210 may include at least some portion of the data stored in the IT room equipment database described in PCT/US08/63675. In another embodiment, this information may include any information needed to support interface 204, such as, among other data, the physical layout of one or more IT room model configurations, the production and distribution characteristics of the cooling providers included in the model configurations, the consumption characteristics of the cooling consumers in the model configurations, and a listing of equipment racks and cooling providers to be included in a cluster.

In one embodiment, IT room database 210 may store types of cooling providers, the amount of cool air provided by each type of cooling provider, and a temperature of cool air provided by the cooling provider. Thus, for example, IT room database 210 includes records of a particular type of computer room air conditioning (CRAC) unit that is rated to deliver airflow at the rate of 5,600 cubic feet per minute (cfm) at a temperature of 68 degrees Fahrenheit. In addition, the IT room database 210 may store one or more cooling metrics, such as inlet and outlet temperatures of the CRACs and inlet and exhaust temperatures of one or more equipment racks. The temperatures may be periodically measured and input into the system, or in other embodiments, the temperatures may be continuously monitored using devices coupled to the system 200.

IT room database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include IT room design and management system 206, network 208 and IT room equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Aspects and embodiments disclosed herein include a compact rack model which provides the capabilities of an explicitly detailed model and the computational efficiency of a black-box model. The proposed model idealizes internal-rack airflows as conforming to a well-defined flow network topology. It predicts IT-equipment inlet temperatures (which depend on internal rack recirculation) and pressure-driven leakage airflows. Consequently, it can model, for example, contained and uncontained architectures, the effects of under-rack cable cutouts, and ceiling-ducted racks (with a sealed rear door).

The model is efficient and robust because it eliminates the need to explicitly model small-scale features in large-scale IT room CFD simulations while not appreciably increasing computational cost relative to the simplest black-box models. It has the potential for high accuracy as internal-rack flow resistances are taken directly from experimental measurements and inputs may be tailored to any rack population or application.

IT rooms provide power, cooling, and network connectivity to IT equipment, and this is almost universally accomplished at the rack scale. IT inlet temperature is the primary metric upon which cooling performance is assessed and is a function of airflow patterns both external and internal to the rack. Consequently, the rack is an important building-block object from which IT room CFD models are constructed.

To date, there is no single, standard way to represent a rack for all applications and simulation goals. Existing models can be broadly categorized as either "black box" or "detailed." With the latter, internal details are explicitly modeled by CFD; with the former, calculations related to internal details are handled separately while data is passed to/from the CFD model as boundary conditions on the periphery of the rack. Black-box models promote fast and robust CFD simulations; by eliminating the need to resolve small-scale geometric details, larger and more uniform grid cells may be employed across the entire IT room CFD model. However, simplistic versions of black-box models, which assume fixed-airflow boundaries and ignore internal-rack airflows, are limited to predicting rack (as opposed to individual IT equipment) inlet temperatures and do not behave as real racks, for example, when their faces are subject to pressurization as a result of containment. Detailed models can, in theory, handle all applications; however, the large number of grid cells required substantially increases solution times.

The main limitations of existing compact rack models are that they cannot predict IT equipment temperatures (by accounting for internal recirculation) or model scenarios such as containment or cable-cutouts beneath the rack in which significant airflow is driven through the rack by external pressure differences. In addition to the racks, IT equipment itself provides additional paths for leakage airflow.

Aspects and embodiments disclosed herein include a compact model that retains the vertical resolution of IT equipment and fan curves and that further accounts for pressure-driven leakage flow: parallel to the IT-equipment airflow, between the rear and top of the rack, and between the rear and bottom of the rack. The model takes pressure and temperature (for "inflows") from the parent CFD model and returns IT-inlet temperatures as well as airflow (velocity) and temperatures (for "outflows") boundary conditions to the parent CFD model. The model may be built into data-center-specific CFD tools or implemented by users of general-purpose tools with access to user-defined functions.

IT-Rack Airflow Characteristics

Figure 3:
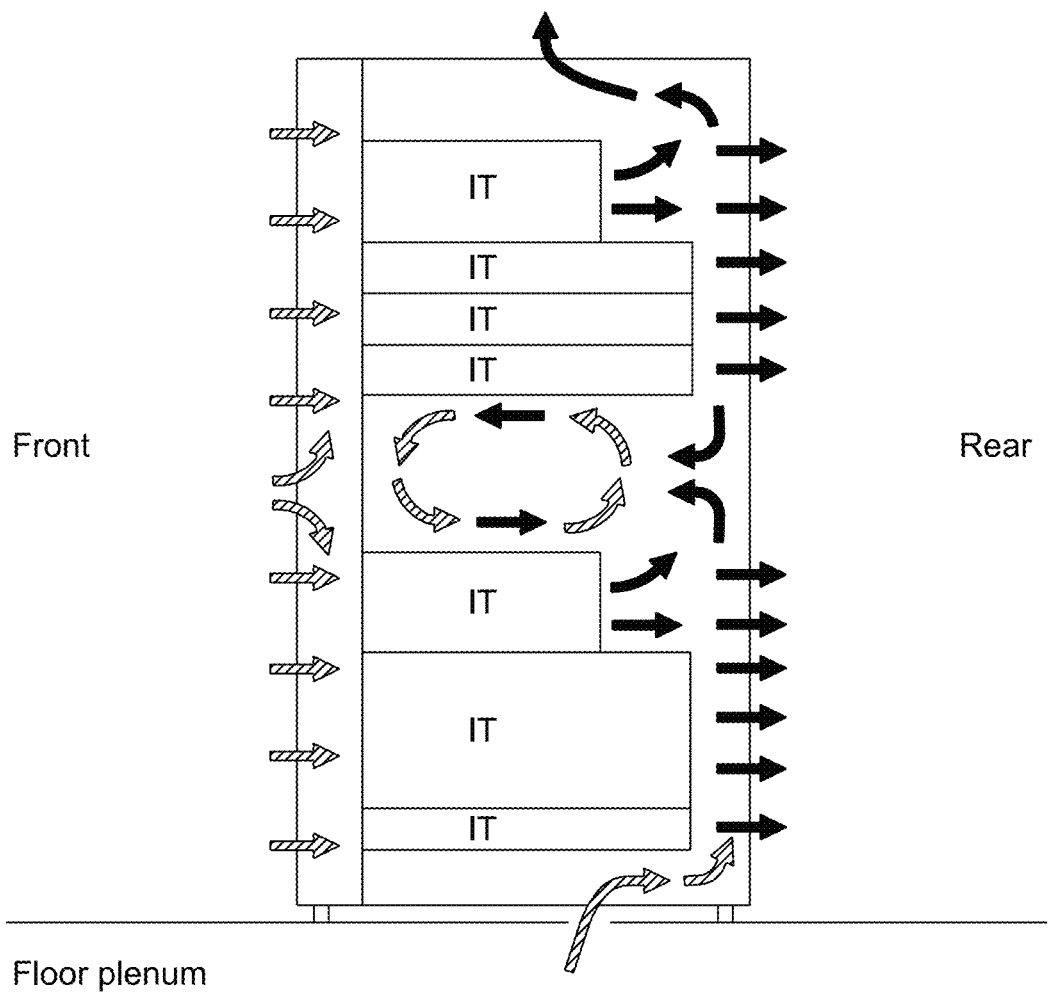
FIG. 3 is a schematic diagram of an example IT equipment rack.

IT room IT equipment (e.g., servers, memory drives, communication interfaces, user interfaces, etc.) is typically stacked in racks as shown in FIG. 3 and is designed to draw in cool air from its front face and supply warm exhaust air through its rear face. The front faces of the IT equipment are aligned with the mounting plane and best practices recommend that unoccupied mounting positions be sealed with blanking panels to limit air recirculation. The front and rear doors of racks are perforated with large open area percentages (for example, about 69%). Rack tops often have significant leakage paths from intentionally perforated sections and/or unsealed cable openings. The bottom of the rack is typically open to some amount of airflow because of the gap between the rack frame and the floor and/or airflow from the floor plenum due to cable cutouts beneath the rack.

Figure 4:
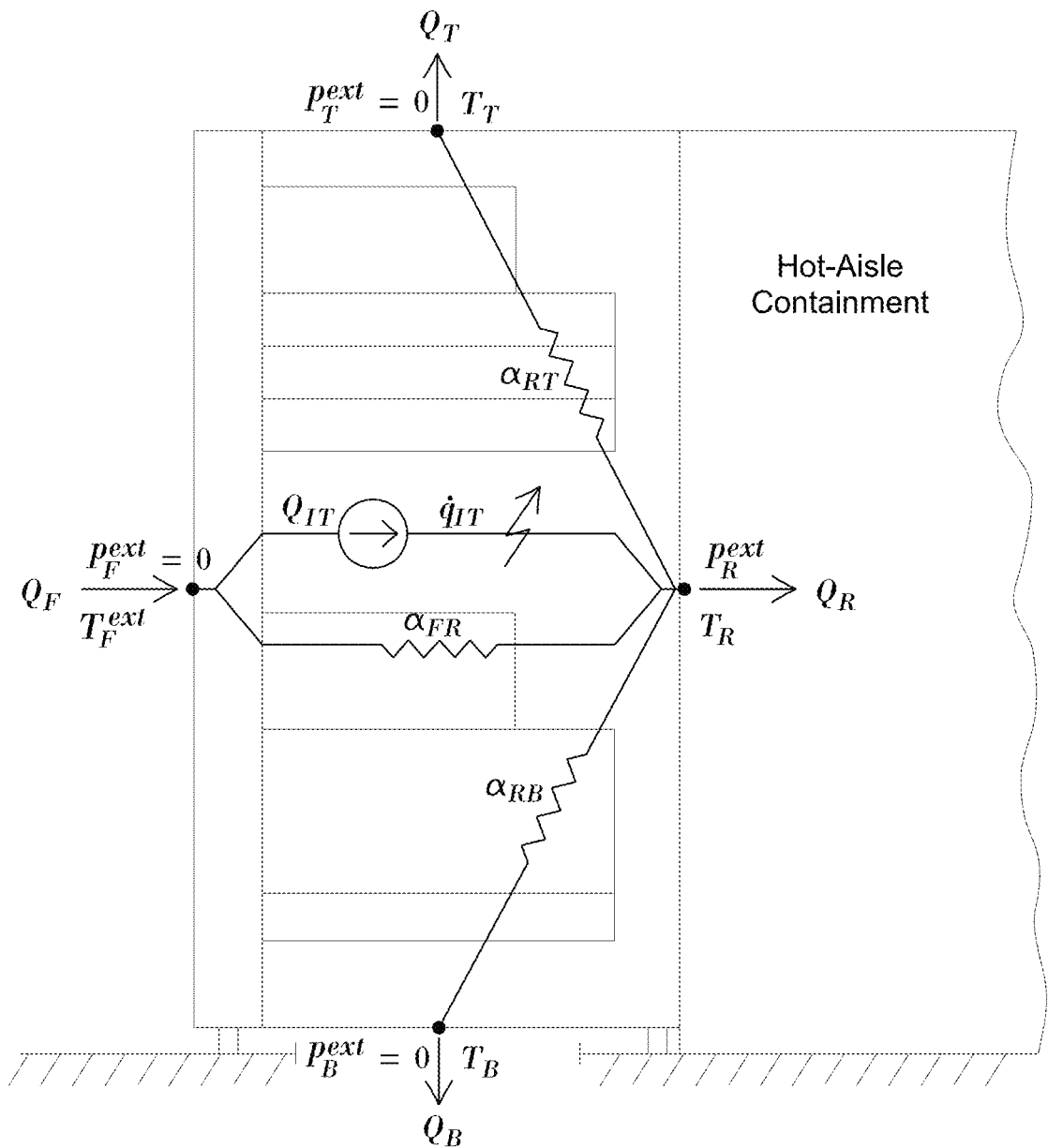
FIG. 4 is a schematic diagram of an example of a single rack configured in a hot aisle containment implementation.

A first embodiment of a model disclosed herein illustrates certain concepts and provides context for the experimentally-measured flow resistances discussed further herein. FIG. 4 shows a single rack configured in a hot aisle containment implementation; leakage flow is idealized as paths connecting the front and rear, rear and top, and rear and bottom of the rack. Volumetric airflow rates $Q_F$, $Q_R$, $Q_T$, and $Q_B$ pass through the front, rear, top, and bottom flow-network nodes, respectively. All node pressures are equal to the surrounding (external) pressures where the room is assumed to be at the reference pressure of zero (unless specified otherwise, pressures referred to herein are gauge pressures—pressures above or below atmospheric pressure). The front airflow $Q_f$ enters the rack at the external air temperature $T_F^{ext}$ and exits the other faces at correspondingnode temperatures which depend on the internal rack details. The nodes are connected by front-to-rear $\alpha_{FR}$, rear-to-top $\alpha_{RT}$, and rear to-bottom $\alpha_{RB}$ resistances which are assumed to be constant and follow the relationship:

$$\Delta P = \alpha Q^2 \quad (1)$$

where $\Delta P$ is the pressure drop across the flow resistance $\alpha$. Equation 1 holds for high-Reynolds-number flows typical of IT rack implementations. The IT airflow $Q_{IT}$, also referred to herein as the IT equipment airflow parameter, may be fixed or variable depending upon, for example, a pressure drop across different faces of the rack. The IT equipment airflow parameter $Q_{IT}$ may be associated with airflow through the rack or through individual items of IT equipment within the rack that is generated by one or more fans included within or otherwise associated with one or more items of IT equipment within the rack. The IT equipment airflow $Q_{IT}$ is heated by a power dissipation $\dot{q}_{IT}$, that may be a manually entered parameter or a parameter calculated by a CFD model or another model known in the art.

As illustrated in FIG. 4, the resistance to leakage airflow depends on the path taken by the airflow through the rack. For example, the front-to-rear resistance is relatively large when the rack is fully populated by IT equipment and/or blanking panels. The rear-to-top resistance is relatively low as the top of the rack is relatively leaky. (It is for this reason, that the magnitude of pressurization is generally larger for cold aisle containment than a corresponding hot-aisle containment implementation.)

Experimental measurements were conducted to determine rack leakage resistances for a configuration like that of FIG. 4. A single hot-aisle-containment pod consisted of two rows of four racks, each rack with dimensions of width $W_0$=600 mm (2 ft)×depth $D_0$=1070 mm (3.5 ft)×height $H_0$=1990 mm (6.5 ft). The racks, which were placed on a hard floor, were populated with a mix of server simulators (which were "off" and sealed to airflow) and 1-U blanking panels. The pressure difference between the hot aisle and surrounding room was measured at several overall-hot-aisle leakage flow rates under different combinations of the rack top and bottom "open" or "blocked." The front-to-rear, rear-to-top, and rear-to-bottom resistances were determined by the best overall fit to the experimental data. Table 1 summarizes the measured data and allows for the calculation of $\alpha_{FR}$, $\alpha_{RT}$, and $\alpha_{RB}$ for racks (or horizontal "slices" of racks) of any width W, height H, or depth D. Note that this scaling is based on the area normal to the flow direction and the fact that the equivalent resistance $\alpha_{eq}$ of resistances in parallel (for $\Delta P \sim Q^2$) is:

$$\frac{1}{\sqrt{\alpha_{eq}}} = \frac{1}{\sqrt{\alpha_1}} + \frac{1}{\sqrt{\alpha_2}} + \ldots \quad (2)$$

The expressions for $\alpha_{RT}$ and $\alpha_{RB}$ further extend these assumptions in a logical manner although, in these cases, the area normal to the flow direction changes from the rear (product of width and height) to the top or bottom (product of width and depth).

TABLE 1

Experimentally Measured Rack Resistances

Front-to-Rear
$$\alpha_{FR} = \left(\frac{W_0}{W}\right)^2 \left(\frac{H_0}{H}\right)^2 \left(1{,}530 \frac{Pa}{\left(\frac{m^3}{s}\right)^2}\right)$$

Rear-to-Top
$$\alpha_{RT} = \left(\frac{W_0}{W}\right)^2 \left(\frac{D_0}{D}\right)^2 \left(\frac{H_0}{H}\right)^2 \left(450 \frac{Pa}{\left(\frac{m^3}{s}\right)^2}\right)$$

Rear-to-Bottom
$$\alpha_{RB} = \left(\frac{W_0}{W}\right)^2 \left(\frac{D_0}{D}\right)^2 \left(\frac{H_0}{H}\right)^2 \left(1{,}600 \frac{Pa}{\left(\frac{m^3}{s}\right)^2}\right)$$

where
$W_0 = 600$ mm $= 2.0$ ft
$D_0 = 1070$ mm $= 3.5$ ft
$H_0 = 1990$ mm $= 6.5$ ft In other embodiments, any one or more of $\alpha_{FR}$, $\alpha_{RT}$, or $\alpha_{RB}$ may be separately measured for a specific implementation and manually input into embodiments of models disclosed herein or may be calculated for the specific implementation from a CFD model of the specific implementation or by other modelling techniques known in the art.

General Compact Rack Model

Figure 5:
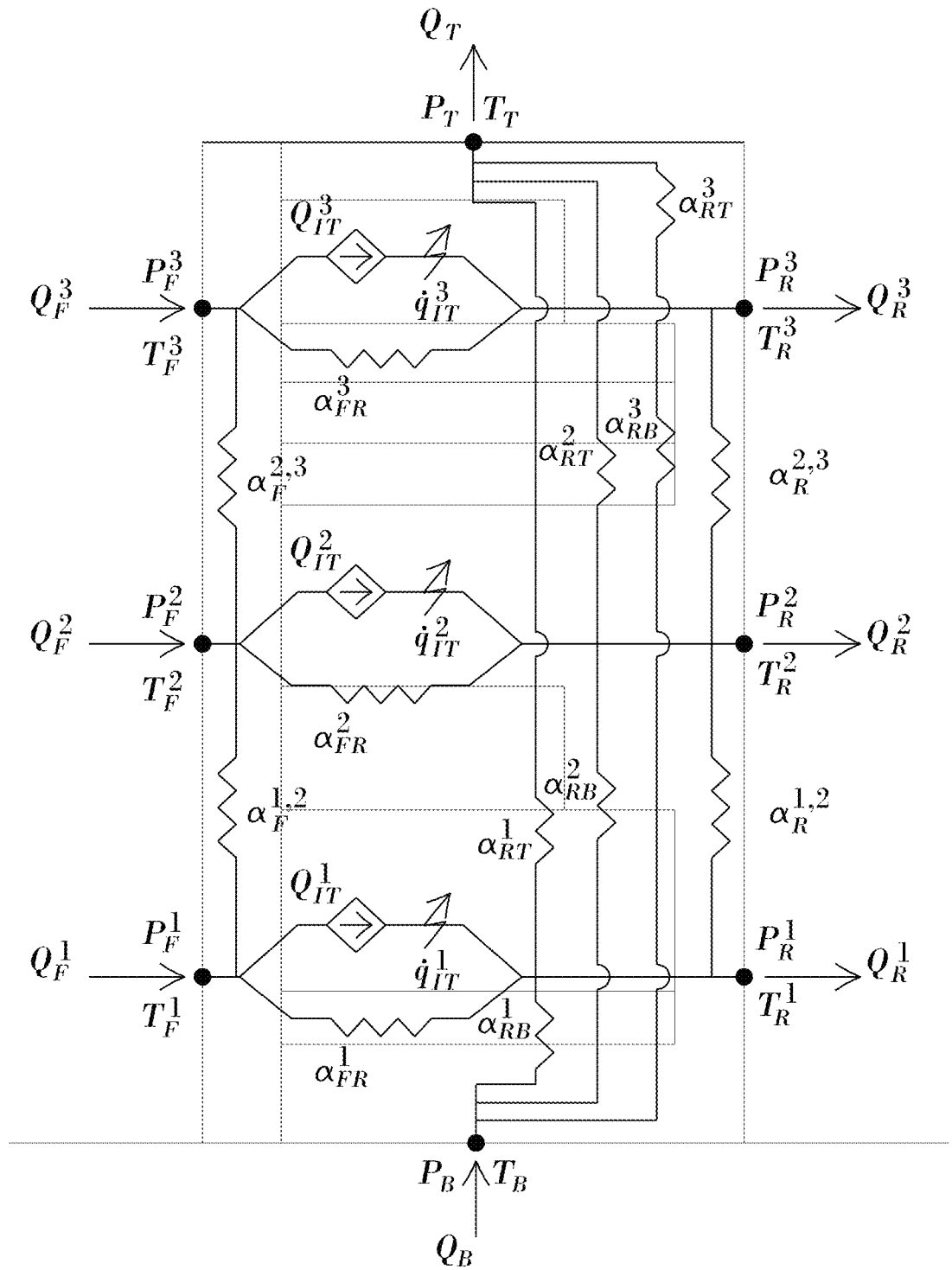
FIG. 5 is an illustration of a general rack model for computing airflow and temperature for air in to and out of a rack.

The simplistic idealization of internal rack airflows may be extended to the general model shown in FIG. 5. For clarity, only three horizontal slices through the rack are depicted; however, any number of slices may be employed to best model the IT-equipment population and interface with the parent CFD model. The rack and CFD models interface only through the flow-network nodes located on the rack faces. Each rack-face node may be considered as "open" (in contact with air—the primary room air, the floor plenum, inside a containment zone, etc.) or "blocked" (in contact with a solid object). Nodes are associated with a specific area on the periphery of the rack which typically includes multiple CFD grid cells. Airflows are spread uniformly; pressures and temperatures are taken as single values, averaged from CFD where appropriate. Additional nodes could be employed; however, representing the top, bottom, (slice) front, and (slice) rear by single nodes is a practical choice considering model complexity, actual racks/airflow physics, and modeling goals.

Computing Airflows

Any rack-face node may be considered "open" or "blocked"; however, there are clearly restrictions on the number of nodes which may be simultaneously blocked. The pressure is equal to the external pressure from the CFD model for "open" nodes and explicitly computed by the rack model for "blocked" nodes. Each front and rear node i is connected through an air flow resistance $\alpha_{FR}^i$. Each rear node i is also connected to both the top and bottom node through air flow resistances $\alpha_{RT}^i$ and $\alpha_{RB}^i$, respectively. Additionally, each front and rear node i is connected to its immediate neighbor above and below, if present, through the front and rear resistances $\alpha_F^{i,j}$ and $\alpha_R^{i,j}$. The various air flow resistance values may be specified as desired to best represent a given rack population; however, $\alpha_{FR}^i$, $\alpha_{RT}^i$, and $\alpha_{RB}^i$ should be chosen so that their in-parallel equivalent resistance is consistent with the overall rack resistance, for example, as idealized by a single-slice model as in FIG. 4. In some embodiments, the various air flow resistance values may be measured for a specific implementation and manually input into embodiments of models disclosed herein or may be calculated for the specific implementation from a CFD model of the specific implementation or by other modelling techniques known in the art. For a rack that is fully populated by IT equipment and/or blanking panels, it is reasonable to assume that all $\alpha_{FR}^i$, $\alpha_{RT}^i$, and $\alpha_{RB}^i$ values are identical for each slice 1. Note that the expressions in Table 1 can be used to compute per-slice air flow resistances by specifying the per-slice value of H. For example, the 2-slice-model a values with $H=H_0/2$ are four times larger than the corresponding full-rack values.

The IT-equipment airflow is further generalized to include a fan curve. This can be any arbitrary airflow-pressure relationship; however, a simple linear model can be defined as:

$$Q = Q_0 \left(1 - \frac{\Delta P}{P_{stag}}\right) \quad (3)$$

Where $Q_0$ is the open flow rate $P_{stag}$ is the stagnation pressure and $\Delta P$ is the pressure drop across the IT equipment.

When blocked by a solid object, the pressure at a node may be computed from a balance of airflow into and out of the node. For example, if rear node 3 (upper right) in FIG. 5 were blocked, the following equation may be used:

$$Q_{IT,0}^3 \left(1 - \frac{P_R^3 - P_F^3}{P_{stag}^3}\right) + \text{Sign } (P_F^3 - P_R^3)\sqrt{\frac{|P_F^3 - P_R^3|}{\alpha_{FR}^3}} + \quad (4)$$

$$\text{Sign } (P_B - P_R^3)\sqrt{\frac{|P_B - P_R^3|}{\alpha_{RB}^3}} + \text{Sign } (P_T - P_R^3)\sqrt{\frac{|P_T - P_R^3|}{\alpha_{RT}^3}} +$$

$$\text{Sign } (P_R^2 - P_R^3)\sqrt{\frac{|P_R^2 - P_R^3|}{a_R^{23}}} = 0$$

where we are assuming a linear IT-equipment fan curve and the Sign function is used to establish the correct airflow direction relative to an assumed convention. If multiple nodes are blocked, a system of such nonlinear equations may be solved for pressure values. Another option is to linearize the $\Delta P \sim Q^2$ relationship; the nonlinearity can be embedded in the resistance value which can be updated iteratively as a function of node pressures as the CFD simulation progresses. Once all pressures are known—either directly from the external fluid—or computed for blocked nodes, airflows can be determined from Equation 1.

Computing Temperatures

Once all network airflows are known, temperatures may be determined from energy balances at each node. The temperature of an airflow stream is assumed to be equal to that of its upwind node. Continuing the example above where rear Node 3 of FIG. 5 is blocked, a steady-state energy balance leads to:

$$T_R^3 = \frac{1}{Q_{in}^3} \{Max(Q_{IT}^3, 0)(T_F^3 + \Delta T_{IT}^3) + Max(Q_{FR}^3, 0)T_F^3 + \quad (5)$$

$$Max(Q_R^{2,3}, 0)T_R^2 - Min(Q_{RT}^3, 0)T_T - Min(Q_{RB}^3, 0)T_B\}$$

where

-continued $$Q_{in}^3 = Max(Q_{IT}^3, 0) + Max(Q_{FR}^3, 0) + Max(Q_R^{2,3}, 0) - Min(Q_{RT}^3, 0) - Min(Q_{RB}^3, 0) \quad (6)$$

and $$\Delta T_{IT}^3 = \frac{\dot{q}_{IT}^3}{\rho c_p Q_{IT}^3} \quad (7)$$

In Equations 5-7, $Q_{in}^3$ the total flow into (or out of) node 3, $\Delta T_{IT}^3$ is the steady state temperature rise across the IT equipment in Slice 3 and $\rho$ and $c_p$ are the density and specific heat of air, respectively. The Max and Min functions are used to zero-out unwanted terms consistent with the upwind method and airflow-direction sign convention. Node temperatures depend on one another and may be computed as a system of equations. Fortunately, the equations are linear and may be solved in the form of Equation 5 with a few Gauss-Seidel iterations or any one of several other linear-equation-solution methods.

The example of rear node 3 discussed above may include a modification to the steady-state term $\Delta T_{IT}^3$ in Equation 5 to include the effects of thermal mass. The additional inputs that may be used are the thermal effectiveness $\varepsilon_{IT}^3$ and thermal capacitance $C_{IT}^3$. The former characterizes the heat transfer between the IT equipment and the airstream passing through it while the latter is simply the product of the mass and specific heat of the IT-equipment. Finally, the parent-CFD time-step size $\Delta t$ is used as additional input and the IT equipment (solid mass) temperature $T_{IT}^3$ would be added to the list of variables computed by the rack model.

Simplified Rack Model

The general model can be implemented as shown in FIG. 5 and used as described for essentially all practical IT room applications. It can handle general variations in pressure over the rack faces and one or more of the nodes may be blocked to airflow. However, there may be a practical incentive for considering a slightly simplified version for IT room CFD simulations. First, in some implementations, the air flow resistances $\alpha_F^{i,j}$ and $\alpha_R^{i,j}$ may not be well characterized. Second, rack-model computations are faster, more robust, and easier to implement if solving nonlinear pressure equations can be avoided—a situation which arises when one or more front or rear nodes are blocked. Fortunately, most practical data-center applications can be handled without a need for well characterized values of $\alpha_F^{i,j}$ and $\alpha_R^{i,j}$ or directly solving nonlinear pressure equations or, at least, systems of nonlinear pressure equations.

Figure 6A:
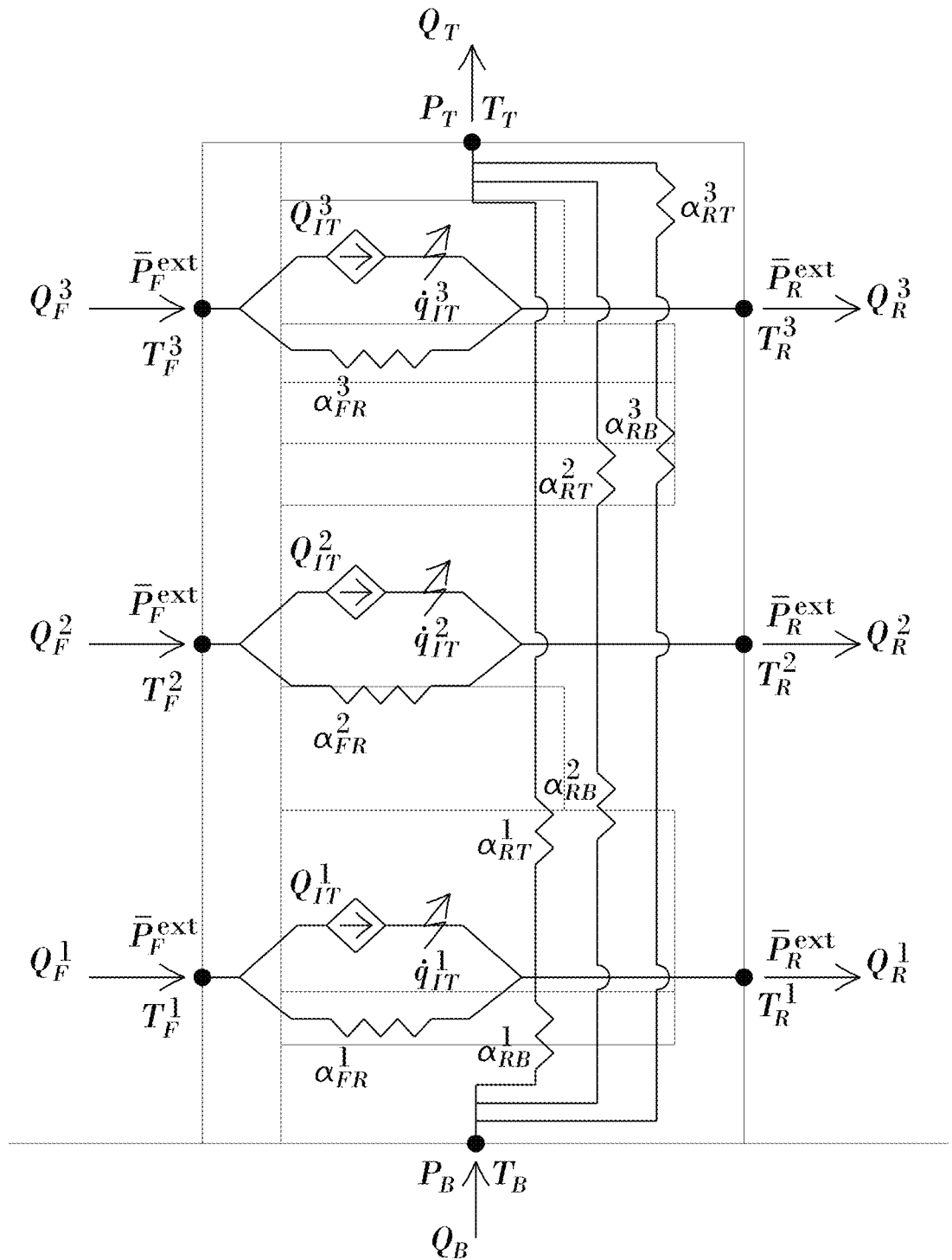
FIG. 6A is an illustration of a simplified rack model for computing airflow and temperature for air in to and out of a rack with an open rear.
Figure 6B:
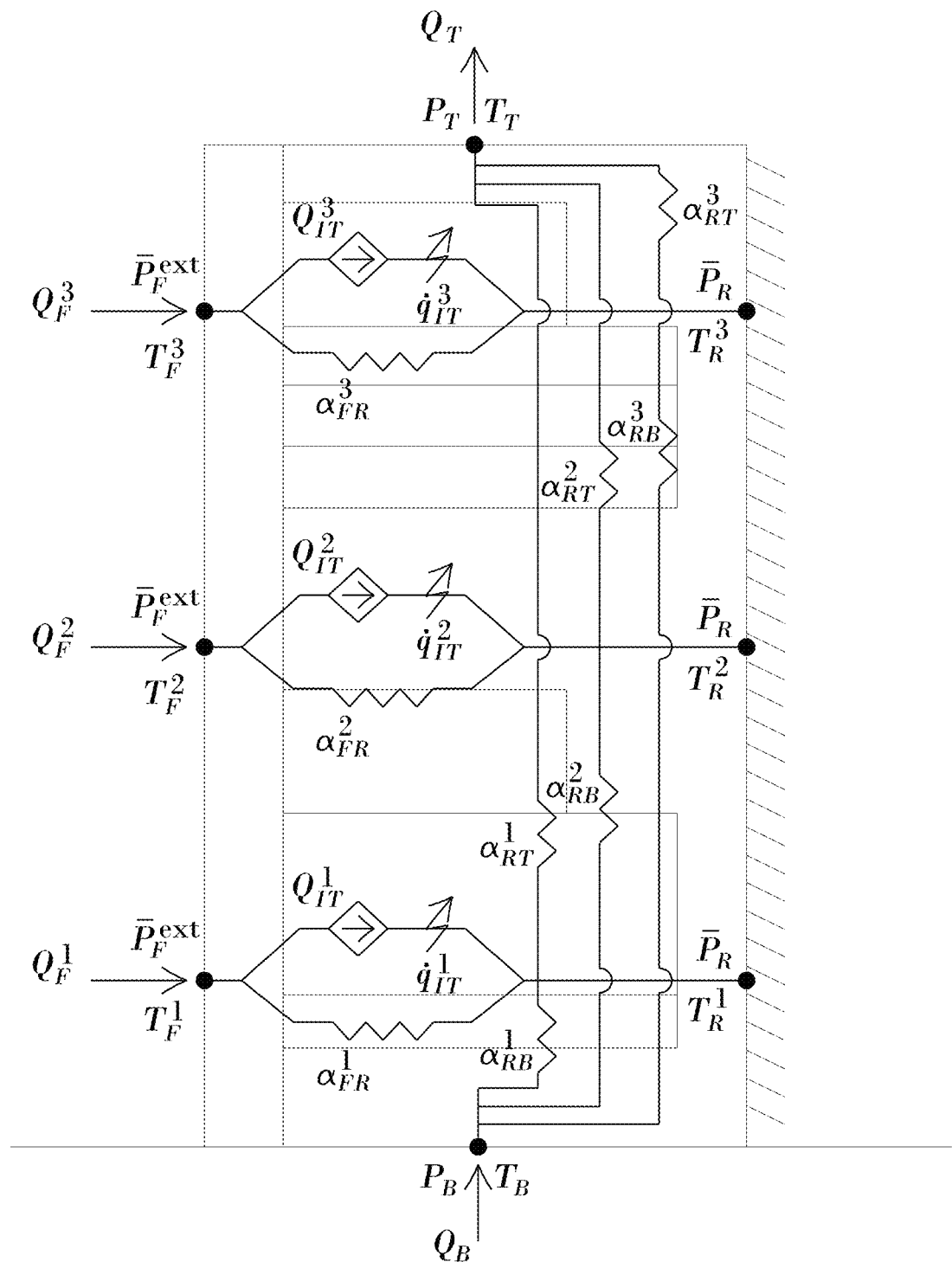
FIG. 6B is an illustration of a simplified rack model for computing airflow and temperature for air in to out of a rack with a blocked rear.

An assumption of a simplified model is that the front face of a rack is completely open while the top, bottom, and rear faces may be completely (but not partially) open or blocked. As significant pressure differences cannot be sustained in a volume of unconfined air, the average external front-face pressure $\overline{P}_F^{ext}$ can be assumed to act upon all front-face nodes. With similar reasoning for the rear face, the simplified model can be represented as shown in FIGS. 6A and 6B. With the rear of the rack open (FIG. 6A), the rear of the rack is at the external average pressure of $\overline{P}_R^{ext}$. With the rear of the rack blocked (FIG. 6B), the rear-face pressure is at the average internal pressure of $\overline{P}_R$. In both scenarios, the resistances $\alpha_F^{i,j}$ and $\alpha_R^{i,j}$ may be omitted entirely from the model. Further, if the top or bottom nodes are blocked, all corresponding resistances $\alpha_{RT}^i$ and $\alpha_{RB}^i$ may also be omitted entirely, because, even though rear nodes may be (indirectly) connected to one another, there are no pressure differences to drive airflow. From purely an airflow-and-pressure perspective, the simplified-model flow networks may be further reduced into their single-slice equivalents analogous to FIG. 4; however, the individual slices are retained in the simplified model to resolve the temperature variations in the vertical direction.

When the rear of the rack is completely blocked (FIG. 6B), for example, by a wall or the rear of the rack is intentionally sealed for a ceiling-ducted implementation, the single rear pressure $\overline{P}_R$ can be determined from a single equation analogous to Equation 4 (without the rear node-to-node term). This single equation, while nonlinear, can still be solved numerically by many well-known root-finding techniques. However, if the IT airflow is assumed to be a constant $Q_{IT}$ and either the top or bottom of the rack is sealed or both faces are open to the same external pressure, the equation for $\overline{P}_R$ may be simplified to the point where it can be solved analytically. For example, in the bottom-blocked scenario, the pressure equation reduces to:

$$Q_{IT} + \text{Sign}\,(\overline{P}_F^{ext} - \overline{P}_R)\sqrt{\frac{|\overline{P}_F^{ext} - \overline{P}_R|}{\alpha_{FR}}} + \text{Sign}\,(P_{ext}^T - \overline{P}_R)\sqrt{\frac{|P_{ext}^T - \overline{P}_R|}{\alpha_{RT}}} = 0$$

where $\alpha_{FR}$ and $\alpha_{RT}$ are the overall equivalent front-to-rear and rear-to-top air flow resistances, respectively, and the top pressure is written as $P_{ext}^T$ because the top is open in this scenario. The analytical solution to equation 8 is as follows:

For $\overline{P}_R > \overline{P}_F^{ext}$ and $\overline{P}_R > P_T^{ext}$, (8A)

$$\overline{P}_R = \frac{\overline{P}_F^{ext} - \beta \cdot P_T^{ext}}{1-\beta} + \frac{\alpha_{FR} \cdot Q_{IT^2}}{(1-\beta)^2}\left\{1+\beta-2\sqrt{\beta\left[\frac{\overline{P}_F^{ext} - P_T^{ext}}{\alpha_{FR} \cdot Q_{IT^2}}(1-\beta)+1\right]}\right\}$$

For $\overline{P}_R \leq \overline{P}_F^{ext}$ and $\overline{P}_R > P_T^{ext}$, (8B)

$$\overline{P}_R = \frac{\overline{P}_F^{ext} + \beta \cdot P_T^{ext}}{1+\beta} + \frac{\alpha_{FR} \cdot Q_{IT^2}}{(1+\beta)^2}\left\{-1+\beta+2\sqrt{\beta\left[\frac{\overline{P}_F^{ext} - P_T^{ext}}{\alpha_{FR} \cdot Q_{IT^2}}(1+\beta)-1\right]}\right\}$$

For $\overline{P}_R > \overline{P}_F^{ext}$ and $\overline{P}_R \leq P_T^{ext}$, (8C)

$$\overline{P}_R = \frac{\overline{P}_F^{ext} + \beta \cdot P_T^{ext}}{1+\beta} + \frac{\alpha_{FR} \cdot Q_{IT^2}}{(1+\beta)^2}\left\{1-\beta+2\sqrt{\beta\left[\frac{-(\overline{P}_F^{ext} - P_T^{ext})}{\alpha_{FR} \cdot Q_{IT^2}}(1+\beta)-1\right]}\right\}$$

where $\beta = \alpha_{FR}/\alpha_{RT}$. Equations 8A-8C may be evaluated for $\overline{P}_R$; the "correct" value is then the one that satisfies the corresponding pressure conditionals. Physically, Equation 8A may correspond, for example, to a rack with its rear against a wall while its front and top are at room pressure. Equation 8B may correspond, for example, to a rack with its rear intentionally sealed and its top ducted to a ceiling plenum at a vacuum relative to room pressure. Equation 8C is impractical as it represents a pressurized top face with all IT exhaust airflow recirculated back to the front of the rack.

For the even simpler, yet still practical, scenario in which pressures at both the front and top of the rack are equal to room pressure ($\overline{P}_F^{ext} = P_T^{ext} = 0$), the analytical solution reduces to:

$$\overline{P}_R = \frac{Q_{IT}^2}{\left(\frac{1}{\sqrt{\alpha_{FR}}} + \frac{1}{\sqrt{\alpha_{RT}}}\right)^2} \quad (9)$$

In this case, $\overline{P}_R$ is simply the magnitude of the pressure drop associated with $Q_{IT}$ passing through the front-to-rear and rear-to-top resistances in parallel.

Data Display

Figure 8A:
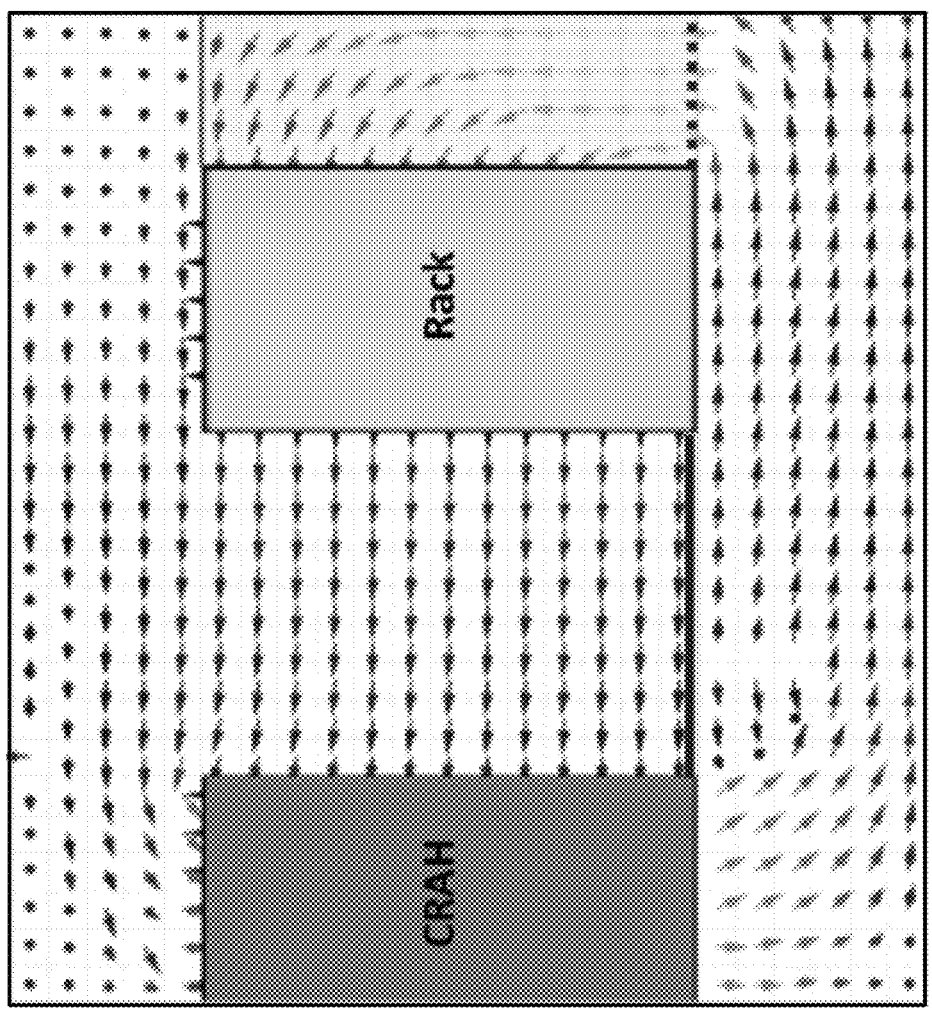
FIG. 8A illustrates airflow velocity in an example of an IT room calculated based on a computational flow dynamics model of the IT room.
Figure 8B:
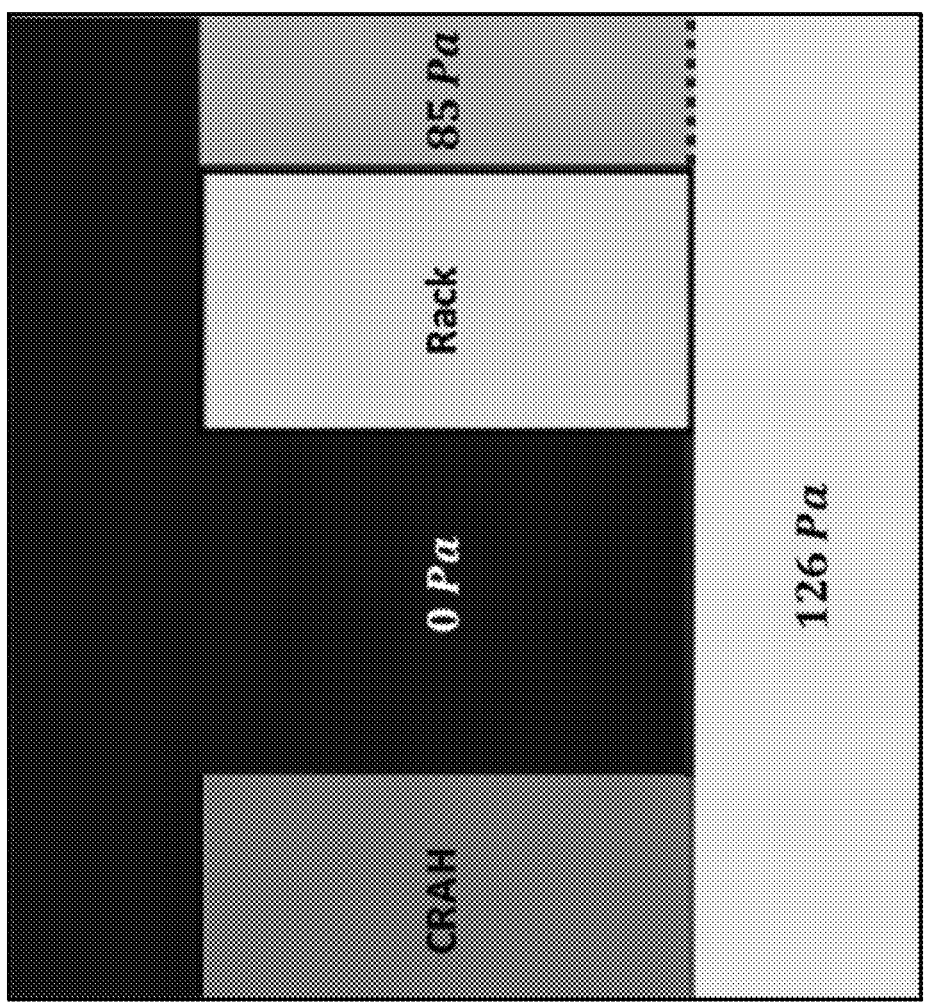
FIG. 8B illustrates air pressures calculated using the computational flow dynamics model of the IT room of FIG. 8A
Figure 9B:
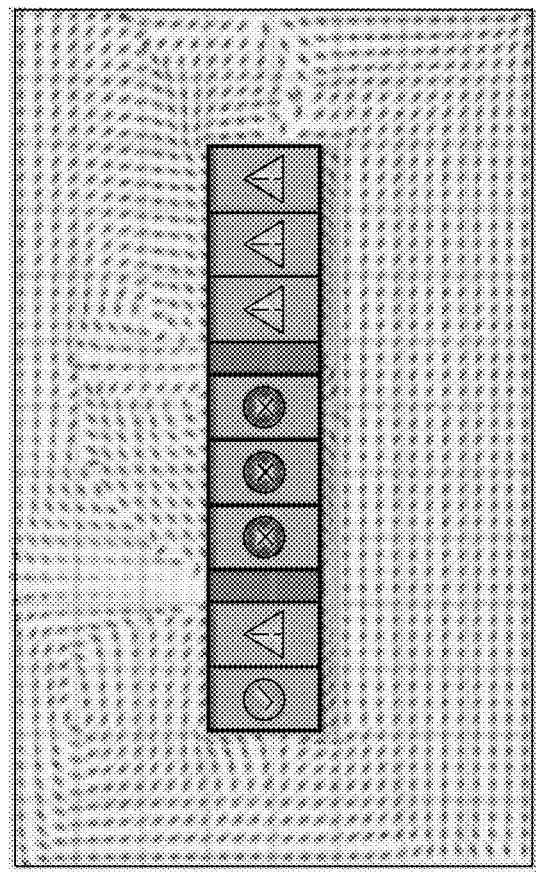
FIGS. 9A and 9B illustrate top down views of a row of racks in which results of a cooling assessment is shown for each rack and which either omit airflow vectors (FIG. 9A) or include the airflow vectors (FIG. 9B)
Figure 9A:
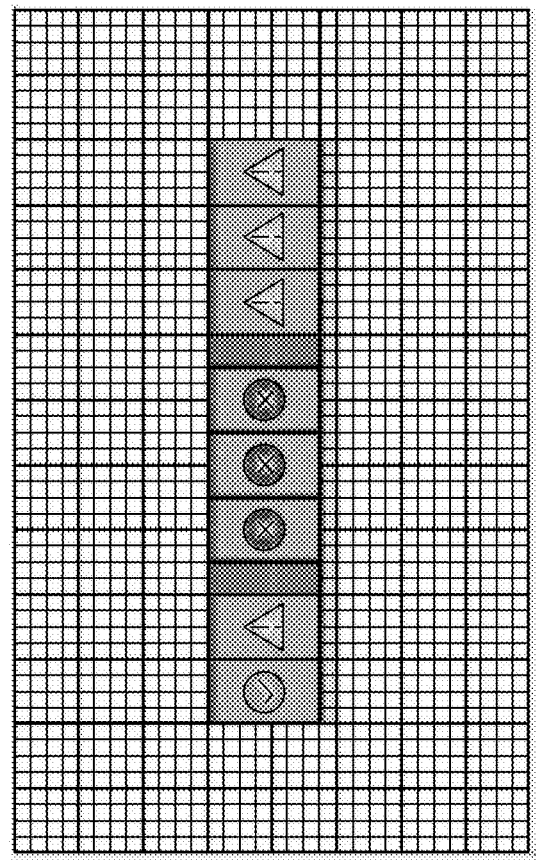
Figure 10:
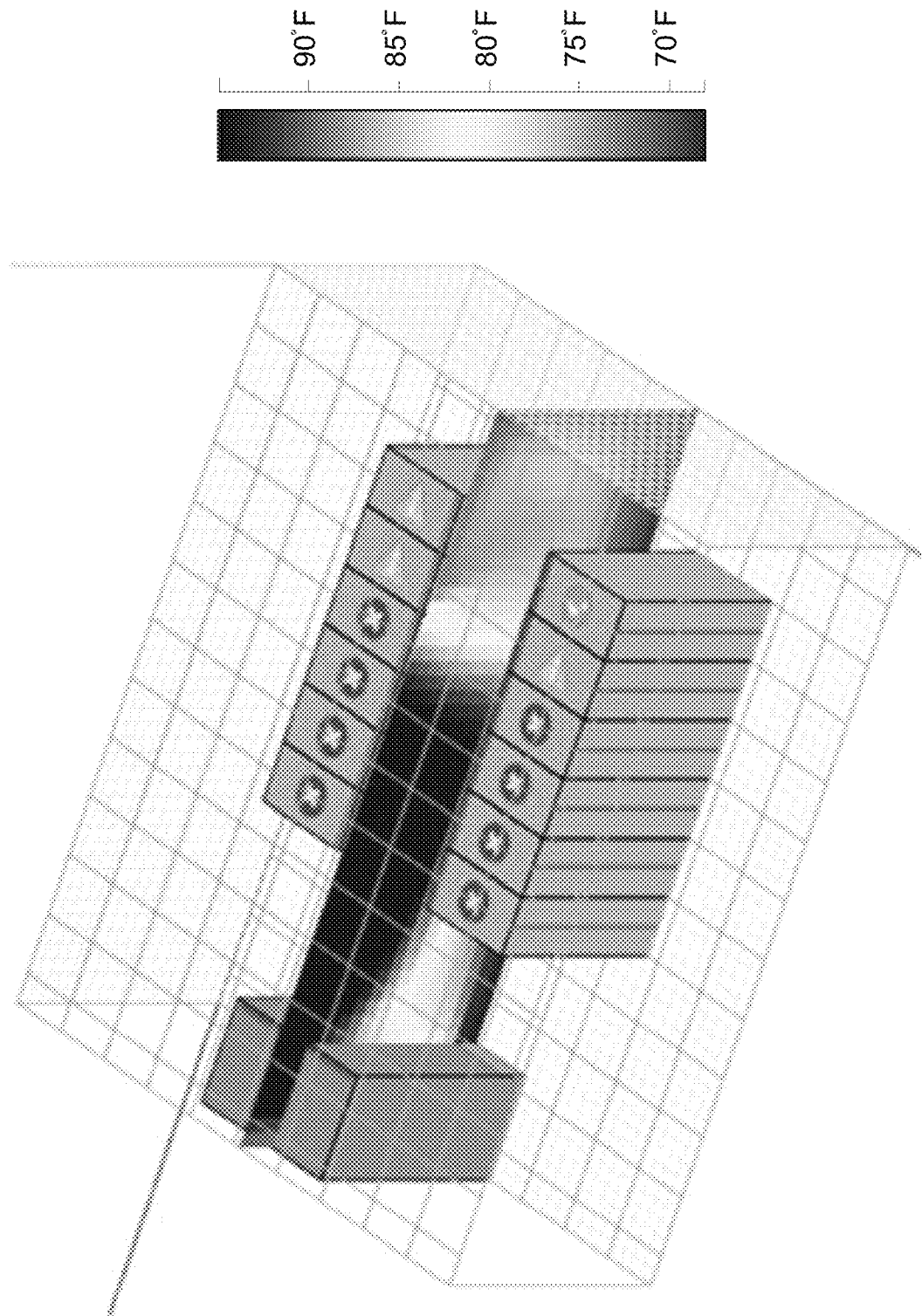
FIG. 10 is an isometric view of an IT room including a temperature gradient through a "slice" of the room in a cold aisle between equipment racks and results of a cooling assessment for each rack.

In various embodiments, results of the model disclosed herein may be provided to a user in the form of a display of one or more of temperature gradients or airflow vectors and/or velocities within or throughout an IT room including at least one rack and cooling provider. Additionally or alternatively one or more of air pressures, air temperatures, and/or airflow velocities within or throughout the IT room may be displayed to a user in a graphical user interface based on results of embodiments of the model disclosed herein. The display may be provided in a graphical user interface associated with a system performing the calculations associated with the model, for example in the interface 116 of the computer system 102 of FIG. 1. Additionally or alternatively, a system performing the calculations associated with the model may output results of the model to a separate computer system, for example, a cloud-based computer system. The separate computer system may generate displays of the results of the model, for example, one or more of temperature gradients or airflow vectors and/or velocities within or throughout an IT room including at least one rack and cooling provider and make these displays available to users through a graphical user interface associated with a web browser or other separate graphical user interface. Non-limiting examples of different displays that may be generated and displayed in accordance with embodiments of systems and methods disclosed herein are illustrated in FIGS. 8A-10. As discussed below FIGS. 8A and 8B illustrate airflow vectors and pressures in side views of the small IT room having one Computer Room Air Handler, one rack, and one perforated tile placed on a raised floor. FIGS. 9A and 9B illustrate top down views of a row of racks in which results of a cooling assessment is shown for each rack and which either omit airflow vectors (FIG. 9A) or include the airflow vectors (FIG. 9B). FIG. 10 is an isometric view of an IT room including a temperature gradient through a "slice" of the room in a cold aisle between equipment racks and results of a cooling assessment for each rack.

Modelling Notes

Note that the resistance values provided in Table 1 strictly only apply to the specific rack construction under the conditions noted—a full population of IT equipment/blanking panels and a hard floor under the rack. Further, in the case of a hard floor, it is desirable to lump the bottom leakage resistance in with that of the top (assuming both are at approximately the same external pressure) to avoid having to explicitly model the airflow in the small space under the rack in the CFD model. In the case of a raised-floor plenum with cable cutouts beneath the rack, the rear-to-bottom air flow resistance could be estimated from a detailed CFD model or additional experimental measurements.

The various front-to-rear air flow resistances can also be chosen to model specific IT and blanking-panel populations. It may be desired to explicitly model larger gaps (missing blanking panels) in the CFD model and hybrid options may be used in some applications.

Rack-Level Example

Figure 7:
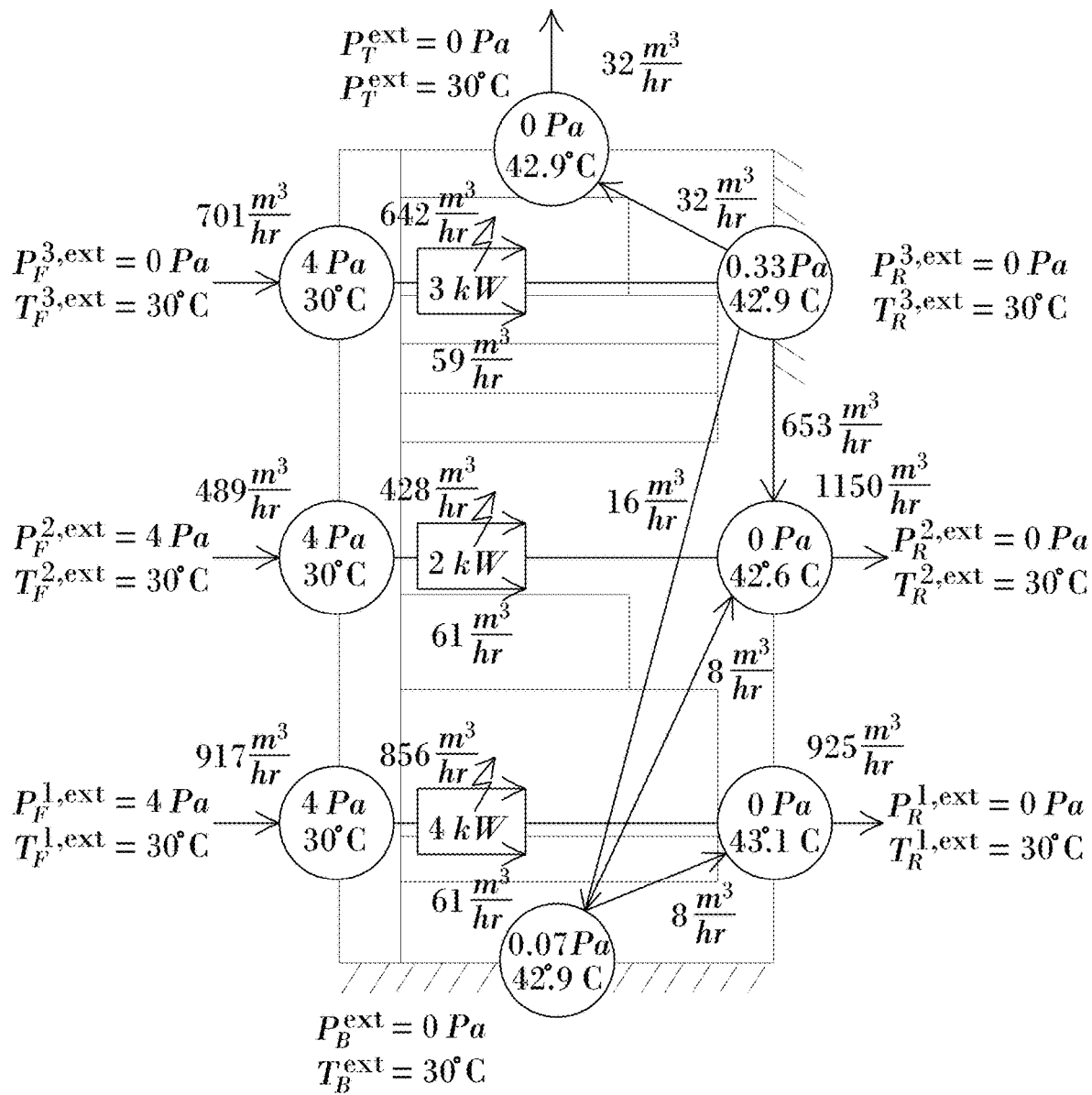
FIG. 7 illustrates an example of a result of temperature and airflow calculations for air in to out of a rack.

To aid development and testing of the general rack model, a standalone tool was developed which performs all steady state compact-rack-model calculations. User-supplied inputs include external pressures and temperatures as well as the various air flow resistance values and IT-equipment characteristics. Primary outputs are rack-face airflow rates and outflow temperatures as well as IT-equipment inlet temperatures. Node pressures and internal-rack airflows are also computed by the model. The detailed numerical example of FIG. 7 further illustrates the concepts discussed above. In this example, the top-rear and bottom nodes are assumed blocked. The front of the rack is pressurized to 4 Pa, for example, due to cold-aisle containment, while the top and the bottom-two rear nodes are open to the 0 Pa room pressure.

The rack dimensions as well as the individual front-to-rear and rear-to-top resistances are assumed to be consistent with the reference values of Table 1: $\alpha_{FR}{}^i=13{,}800$ Pa/(m³/s)² and $\alpha_{RT}{}^i=4{,}050$ Pa/(m³/s)². The front and rear air flow resistances are (arbitrarily) assumed to be $\alpha_F{}^{i,j}$ and $\alpha_R{}^{i,j}=10$ Pa/(m³/s)². The density and specific heat capacity of air are assumed to be $\rho=1.19$ kg/m3 and $C_p=1{,}005$ J/(kg °C.), respectively.

Because the top-rear and bottom nodes are blocked, these pressures may be computed from airflow balances analogous to Equation 4. All other node pressures are known from the specified external conditions. With all pressures known, airflows may be computed from Equation 1. Finally, node temperatures are solved from a set of linear equations analogous to Equation 5. Note that, because of the pressurized rack front, the IT inlet temperatures are equal to the external temperatures in this example. The sum of all airflows and energy flows into or out of each node is identically zero.

CFD-Implemented Example

The simplified versions of the compact rack model discussed above were built into a IT room-specific CFD application. The CFD solver is based on a Fast Fluid Dynamics (FFD) algorithm. The following example demonstrates the ability of the rack model to generate the correct containment-zone pressure.

FIGS. 8A and 8B show side views of the small IT room having one CRAH (Computer Room Air Handler), one rack, and one perforated tile placed on a raised floor. The room also includes a completely sealed containment structure which is placed above the perforated floor tile. The CRAH has a fixed airflow rate of 1,000 cfm (1,700 m³/hr) while the rack IT airflow is 500 cfm (850 m³/hr). Again, it is assumed that the rack leakage-resistance characteristics and dimensions are consistent with the reference values of Table 1. The raised floor is assumed to be perfectly sealed and the 25%-open-area tile has a flow resistance of $\alpha_T=184$ Pa/(m³/s)².

The pressures in the three distinct zones in this example can be readily verified from simple flow network model calculations. However, the primary value of this example is to demonstrate the utility of the rack model. It may be used in contained and uncontained applications alike and the addition of containment (even perfectly sealed containment) does not create mass balance concerns for the CFD model. Instead, the cold-aisle-containment pressure in the example of FIGS. 8A and 8B simply "floats" to the level required to maintain a flow balance.

In embodiments above, processes and systems are provided that can determine relevant temperatures and air flows in an IT room and within racks in the IT room. The systems and methods can be used to provide optimized design of an IT room by using results of the systems and methods to change the actual layout and/or capacity of equipment or the proposed layout and/or capacity of equipment. In processes described above, values related to IT room cooling, including airflows and temperatures may be determined. In at least some embodiments, the values determined are predictions for actual values that will occur in an IT room having the parameters modeled. In methods of at least one embodiment of the invention, after successful modeling of a cluster in an IT room, the results of the model may be used as part of a system to order equipment, ship equipment and install equipment in an IT room as per the designed layout.

In at least some embodiments described herein, airflow in a plenum is described as being generated by a CRAC. Systems and methods described herein can be used with other types of sources of air in plenums, including other types of cooling devices and fans.

In at least some embodiments of the invention discussed herein, the performance of assessments and calculations in real-time refers to processes that are completed in a matter of a few seconds or less rather than several minutes or longer as can happen with complex calculations, such as those involving typical CFD model calculations.

In at least some embodiments described above, the design of an IT room and/or actual parameters in an IT room are altered based on predicted temperature and/or airflow. For example, a user of the IT room design and management system may change the location of coolers or the types of coolers that are used in the actual layout of equipment or the proposed layout of equipment in the IT room. These alterations may be implemented to improve the cooling performance and/or may be implemented to provide cost and/or power savings when the performance is found to be within predetermined specifications. Further, based on determined airflow values, a data management system in accordance with one embodiment, may control one or more CRACs to adjust the airflow, and in addition, one or more equipment racks can be controlled to reduce power if the airflow is not adequate to provide sufficient cooling.

Based on the outputs of embodiments of the model disclosed herein one or more parameters of cooling and/or heating systems of an IT room may be adjusted, for example, to obtain more desirable airflow and/or temperature distributions within the IT room and/or within individual IT racks or IT equipment in the IT room. Additionally or alternatively, parameters contributing to heating of IT equipment in an IT room, for example, computational load assigned to different IT equipment may be adjusted based on the outputs of embodiments of the model disclosed herein to obtain more desirable airflow and/or temperature distributions within the IT room and/or within individual IT racks or IT equipment in the IT room. These adjustments may be performed automatically by a computer system implementing aspects of the model or by a computer system receiving the outputs of the model from another computer system implementing the model. These adjustments may additionally or alternatively be performed manually based on data regarding air temperature, air pressure, or air velocity within the IT room, for example, at one or more faces of more or more IT equipment racks that is displayed to a user in a graphical user interface based on outputs of embodiments of the model disclosed herein. A computer system implementing embodiments of the model disclosed herein may provide outputs of the model for use by control systems and methods as described in U.S. patent application Ser. No. 16/617,749, that is incorporated herein by reference in its entirety for all purposes.

Current systems for determining and displaying one or more of air temperature, pressure, or velocity in an IT room including an IT rack at least typically cannot quickly and accurately determine airflow velocities and rack air outflow temperatures and generate, based on the output, a display in a graphical user interface of the system illustrating one or more of air temperatures, air pressures, or airflow velocities within the IT room. This is a technical problem. An exemplary embodiment of a system for determining and displaying in a graphical user interface one or more of air temperature, pressure, or velocity in an IT room including an IT rack may comprise a processor instructed to receive an input comprising airflow resistance parameters through the rack, an IT equipment airflow parameter, a heat-dissipation parameter, an external pressure, and an external temperature. The heat-dissipation parameter may be associated with the IT equipment airflow parameter, and the IT equipment airflow parameter may be associated with at least one fan providing airflow through the rack. The processor may be instructed to run the input through a flow-network solver that solves for a rack-airflow rate and a rack air outflow temperature based on the input and to provide an output including the rack-airflow rate and the rack air outflow temperature. The processor may be instructed to generate, based on the output, a display in a graphical user interface illustrating one of air temperatures, air pressures, or airflow velocities within the IT room. At least this foregoing combination of features comprises a system for determining and displaying one or more of air temperature, pressure, or velocity in an IT room including an IT rack that serves as a technical solution to the foregoing technical problem. This technical solution is not routine and in unconventional. This technical solution is a practical application of a computer-aided-design system that solves the foregoing technical problem and constitutes an improvement in the technical field of software design for IT-room computer-aided-design applications at least by facilitating faster and more accurate display of air temperature, pressure, or velocity in an IT room including an IT rack.

Current systems for determining and displaying one or more of air temperature, pressure, or velocity in an IT room including an IT rack at least typically cannot quickly and accurately determine airflow velocities and rack air outflow temperatures and generate, based on the output, a display in a graphical user interface of the system illustrating one or more of air temperatures, air pressures, or airflow velocities within the IT room. This is a technical problem. An exemplary embodiment of a system for determining and displaying one or more of air temperature, pressure, or velocity in an IT room including an IT rack may comprise a processor instructed to receive an input comprising airflow resistance between a front and a rear of the rack, airflow resistance between the rear and a top of the rack, airflow resistance between the rear and a bottom of the rack, an IT equipment airflow parameter associated with at least one fan providing airflow through the rack, a heat-dissipation parameter associated with the IT equipment airflow parameter, an external pressure, and an external temperature. The processor may be instructed to run the input through a flow-network solver that solves for a rack-airflow rate and a rack air outflow temperature based on the input and to provide an output including the rack-airflow rate and the rack air outflow temperature. The processor may be instructed to generate, based on the output, a display in a graphical user interface illustrating one of air temperatures, air pressures, or airflow velocities within the IT room. At least this foregoing combination of features comprises a system for determining and displaying one or more of air temperature, pressure, or velocity in a graphical IT room including an IT rack that serves as a technical solution to the foregoing technical problem. This technical solution is not routine and is unconventional. This technical solution is a practical application of a computer-aided-design system that solves the foregoing technical problem and constitutes an improvement in the technical field of software design for IT-room computer-aided-design applications at least by facilitating faster and more accurate display of air temperature, pressure, or velocity in a graphical IT room including an IT rack.

In at least some embodiments described above, tools and processes are provided for determining temperatures and airflows in an IT room. In other embodiments, the tools and processes may be used in other types of facilities, and may also be used in mobile applications, including mobile IT rooms. Further, processes and systems in accordance with embodiments described herein may be used in overhead air plenums, and other types of air plenums.

Nomenclature $c_p$ Specific heat capacity
$C$ Thermal capacitance
D Depth, rack
H Height, rack or slice
$P_{stag}$ Pressure, stagnation
P Pressure
$\bar{P}$ Pressure, average
$\dot{q}$ Heat dissipation rate
Q Volumetric flowrate
$Q_{in}$ Volumetric flowrate, into a node
$Q_0$ Volumetric flowrate, open flowrate
T Temperature
W Width, rack
α Flow resistance
Flow resistance ratio, $\alpha_{FR}/\alpha_{RT}$
ΔP Pressure difference
Δt Time step size
ε Thermal effectiveness
ρ Density
Subscripts
0 Reference dimension
B Bottom
F Front
FR Front to rear
IT IT equipment
R Rear
RB Rear to bottom
RT Rear to top
T Top
Superscripts
ext External (to rack model)
i Slice index
i,j i to j

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A system for determining and displaying in a graphical user interface one or more of air temperature, pressure, or velocity in an information technology (IT) room including an IT equipment rack, the system comprising:
a processor configured to:
receive an input comprising airflow resistance parameters through the rack, an IT equipment airflow parameter, a heat-dissipation parameter, an external pressure, and an external temperature, wherein:
the heat-dissipation parameter is associated with the IT equipment airflow parameter, and
the IT equipment airflow parameter is associated with at least one fan associated with IT equipment in the rack and providing airflow through the IT equipment,
run the input through a flow-network solver that solves for airflow velocities through at least one face of the rack and a rack air outflow temperature based on the input; and
provide an output including the airflow velocities and the rack air outflow temperature.

2. The system of claim 1, wherein the airflow resistance parameters include airflow resistance between a front and a rear of the rack, airflow resistance between the rear and a top of the rack, and airflow resistance between the rear and a bottom of the rack.

3. The system of claim 1, wherein the processor is further configured to output the rack-airflow rate and the rack air outflow temperature to a computational fluid dynamics model and to calculate temperatures and air flows throughout the IT room utilizing the computational fluid dynamics model.

4. The system of claim 3, wherein the processor is further configured to one of control one or more computer room air conditioners to adjust airflow in the IT room or control one or more items of equipment housed in the rack to reduce power if the rack air outflow temperature is not adequate to provide sufficient cooling to equipment housed in the rack.

5. A non-transitory computer-readable medium storing thereon sequences of computer-executable instructions for determining and displaying in a graphical user interface one or more of air temperature, pressure, or velocity in an information technology (IT) room including an equipment rack, the sequences of computer-executable instructions including instructions that cause at least one processor to:
receive an input comprising airflow resistance parameters through the rack, an IT equipment airflow parameter, a heat-dissipation parameter, an external pressure, and an external temperature, wherein:
the heat-dissipation parameter is associated with the IT equipment airflow parameter, and
the IT equipment airflow parameter is associated with at least one fan providing airflow through the rack,
run the input through a flow-network solver that solves for a rack-airflow rate and a rack air outflow temperature based on the input; and
provide an output including the rack-airflow rate and the rack air outflow temperature.

6. The computer-readable medium of claim 5, wherein the airflow resistance parameters include airflow resistance between a front and a rear of the rack, airflow resistance between the rear and a top of the rack, and airflow resistance between the rear and a bottom of the rack.

7. The computer-readable medium of claim 5, wherein solving for the rack-airflow rate includes solving for a flow rate of air through each of a front face of the rack, a rear face of the rack, a top of the rack, and a bottom of the rack.

8. The computer-readable medium of claim 5, wherein solving for the rack air outflow temperature includes solving for temperatures of air flowing through each of a rear face of the rack and a top of the rack.

9. The computer-readable medium of claim 8, wherein solving for the rack air outflow temperature further includes solving for a temperature of air flowing through a bottom of the rack.

10. The computer-readable medium of claim 5, wherein the flow-network solver solves for the rack-airflow rate and the rack air outflow temperature for multiple portions of the rack each at different heights.

11. The computer-readable medium of claim 10, wherein the flow-network solver solves for the rack-airflow rate and the rack air outflow temperature for the multiple portions of the rack under one of a constraint that air flow through the top of the rack is blocked, a constraint that air flow through the bottom of the rack is blocked, or a constraint that air flow through the rear of the rack in each of the multiple portions of the rack is blocked.

12. The computer-readable medium of claim 11, wherein the flow-network solver solves for the rack-airflow rate and the rack air outflow temperature for the multiple portions of the rack without utilizing air flow resistances between adjacent ones of the multiple portions of the rack as input variables.

13. The computer-readable medium of claim 11, wherein the flow-network solver solves for average pressure at the rear of the rack under a constraint that air flow through the rear of the rack is blocked utilizing only pressure at the front of the rack, pressure at the top of the rack, air flow resistance between the front and rear of the rack, air flow resistance between the rear and top of the rack, and the fixed airflow rate as input variables.

14. The computer-readable medium of claim 13, wherein the flow-network solver solves for average pressure at the rear of the rack under a constraint that air flow through the rear of the rack is blocked utilizing only air flow resistance between the front and rear of the rack, air flow resistance between the rear and top of the rack, and the fixed airflow rate as input variables.

15. A method for determining and displaying in a graphical user interface one or more of air temperature, pressure, or velocity in an information technology (IT) room including an equipment rack, the method comprising:
    receiving an input comprising airflow resistance parameters through the rack, an IT equipment airflow parameter, a heat-dissipation parameter, an external pressure, and an external temperature, wherein:
        the heat-dissipation parameter is associated with the IT equipment airflow parameter, and
        the IT equipment airflow parameter is associated with at least one fan providing airflow through the rack,
    running the input through a flow-network solver that solves for a rack-airflow rate and a rack air outflow temperature based on the input; and
    outputting the rack-airflow rate and the rack air outflow temperature.

16. The method of claim 15, wherein the airflow resistance parameters include airflow resistance between a front and a rear of the rack, airflow resistance between the rear and a top of the rack, and airflow resistance between the rear and a bottom of the rack.

17. The method of claim 15, wherein solving for the rack-airflow rate includes solving for a flow rate of air through each of a front face of the rack, a rear face of the rack, a top of the rack, and a bottom of the rack.

18. The method of claim 15, wherein solving for the rack air outflow temperature includes solving for temperatures of air flowing through each of a rear face of the rack and a top of the rack.

19. The method of claim 18, wherein solving for the rack air outflow temperature further includes solving for a temperature of air flowing through a bottom of the rack.

20. The method of claim 15, wherein the flow-network solver solves for the rack-airflow rate and the rack air outflow temperature for multiple portions of the rack each at different heights.

\* \* \* \* \*